United States Patent
Matsuo et al.

(10) Patent No.: US 9,031,163 B2
(45) Date of Patent: May 12, 2015

(54) PHASED ARRAY TRANSMISSION DEVICE

(75) Inventors: Michiaki Matsuo, Osaka (JP); Tadashi Morita, Kanagawa (JP); Takaaki Kishigami, Tokyo (JP); Hirohito Mukai, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/122,439

(22) PCT Filed: Aug. 1, 2012

(86) PCT No.: PCT/JP2012/004900
§ 371 (c)(1),
(2), (4) Date: Nov. 26, 2013

(87) PCT Pub. No.: WO2013/018365
PCT Pub. Date: Feb. 7, 2013

(65) Prior Publication Data
US 2014/0192923 A1    Jul. 10, 2014

(30) Foreign Application Priority Data

Aug. 2, 2011 (JP) ................................. 2011-169547
Mar. 23, 2012 (JP) ................................. 2012-067989

(51) Int. Cl.
H04L 27/00 (2006.01)
H04L 1/00 (2006.01)
H01Q 3/26 (2006.01)
H01Q 3/28 (2006.01)
(Continued)

(52) U.S. Cl.
CPC ............. *H04L 1/0033* (2013.01); *G01S 7/4026* (2013.01); *H01Q 3/2605* (2013.01); *H01Q 3/267* (2013.01); *H01Q 3/28* (2013.01); *H01Q 3/36* (2013.01)

(58) Field of Classification Search
USPC ......................................................... 375/299
See application file for complete search history.

(56) References Cited

U.S. PATENT DOCUMENTS

| 5,566,363 A | 10/1996 | Senda |
| 7,230,570 B2 | 6/2007 | Thomas et al. |
| 8,019,285 B2 | 9/2011 | Nakamura |

(Continued)

FOREIGN PATENT DOCUMENTS

| JP | 11-274954 A | 10/1999 |
| JP | 2002-076743 A | 3/2002 |

(Continued)

OTHER PUBLICATIONS

International Search Report, mailed Sep. 11, 2012, for PCT/JP2012/004900, 4 pages.

(Continued)

*Primary Examiner* — Tanmay Shah
(74) *Attorney, Agent, or Firm* — Seed IP Law Group PLLC

(57) ABSTRACT

Transmission outputs of a plurality of transmission branches (101, 102) are extracted by coupler sections (161, 162). Branch detectors (121, 122) respectively detect the levels of the extracted signals of the respective transmission branches and a combination detector (130) detects an output obtained by combining two extracted outputs from the transmission branches by a signal combining section (110). An amplitude error is detected and corrected by comparing output levels of the branch detectors (121, 122), and a phase error is detected and corrected by an output level of the combination detector (130).

10 Claims, 16 Drawing Sheets

(51) Int. Cl.
*H01Q 3/36* (2006.01)
*G01S 7/40* (2006.01)

(56) References Cited

U.S. PATENT DOCUMENTS

| 8,451,942 | B2 | 5/2013 | Otaka et al. |
| 2004/0252055 | A1 | 12/2004 | Thomas et al. |
| 2005/0018597 | A1 | 1/2005 | Yuda et al. |
| 2005/0239419 | A1 | 10/2005 | Fudaba et al. |
| 2008/0079634 | A1 | 4/2008 | Nakamura |
| 2011/0116558 | A1 | 5/2011 | Otaka et al. |

FOREIGN PATENT DOCUMENTS

| JP | 2005-057377 A | | 3/2005 |
| JP | 2005-522062 A | | 7/2005 |
| JP | 2005-348236 A | | 12/2005 |
| JP | 2006-279901 A | | 10/2006 |
| JP | 2006279901 A | * | 10/2006 |
| JP | 2008-85926 A | | 4/2008 |
| JP | 2010-010993 A | | 1/2010 |
| JP | 2010-193280 A | | 9/2010 |

OTHER PUBLICATIONS

Konishi, Y., "Jitsuyou Maikuro-ha Kairosekkei Gaido" ("Practical microwave circuit design guide"), Sogo Denshi Shuppansha, Jun. 1996, p. 13 (First Edition), 8 pages.

Extended European Search Report dated Feb. 12, 2015, for corresponding EP Application No. 12820182.9-1852/2741430, 7 pages.

* cited by examiner (A)

(B)

| INPUT A | INPUT B | OUTPUT C | OUTPUT D |
|---|---|---|---|
| 1/0 | 1/0 | 1/−45 | 1/−45 |
| 1/0 | 1/−10 | 0.909/−50 | 1.083/−50 |
| 1/0 | 1/+10 | 1.083/−40 | 0.909/−40 |
| 1/0 | 1/90 | 1.414/0 | 0/0 |
| 1/0 | 1/180 | 1/45 | 1/−135 |

AMPLITUDE (V) / PHASE (deg)

PHASE ADJUSTMENT TABLE PTB

| PHASE DIFFERENCE | RATIO OF OUTPUT VALUE OF ADC TO MAXIMUM VALUE |
|---|---|
| 10° | 0.9848 |
| 20° | 0.9396 |
| 30° | 0.8660 |
| ⋮ | ⋮ |

PHASED ARRAY TRANSMISSION DEVICE

TECHNICAL FIELD

The present invention relates to a phased array transmission device that transmits a wireless signal using a phased array antenna.

BACKGROUND ART

A phased array antenna technique has been widely used in the field of wireless communication and radar, and may be applied to a transmission device to form beam directionality and electronic scanning of a beam. For example, in the field of wireless communication, it is possible to enlarge a range of communication area by forming a beam and enhancing an antenna gain, or to dynamically control a coverage area according to the number of users controlled in a base station. Further, in the application to radar, by radiating a beam of sharp directionality formed by a phased array antenna to a detection object from a transmission device, it is possible to suppress reflection (clutter reflection) from a non-detection target, to thereby enhance the detection accuracy.

An array antenna transmission device disclosed in Patent Literature 1 is a transmission device that uses a phased array antenna technique, in which a plurality of antenna elements is arranged in an array form. In this transmission device, by appropriately controlling the phase and amplitude of each of a plurality of parallel transmission systems (hereinafter, referred to as "transmission branches") that supplies electricity to the respective antenna elements, it is possible to obtain a desired directionality gain as an antenna.

In wireless communication using a phased array antenna, the related art example disclosed in Patent Literature 1 is used, for example, as a technique that corrects a phase error and an amplitude error. The array antenna transmission and reception device in Patent Literature 1 has a configuration in which RF transmitters are provided to respectively supply electricity to the plurality of antennas to form a beam, in which RF receivers for calibration that detect amplitude and phase errors of respective transmission branches, a fast Fourier transformer and a calibration value measuring section are separately provided. In order to realize error correction, transmission signals of the respective transmission branches extracted by a changeover switch are sequentially received and processed to calculate a calibration value for correction of error detection and correction. Further, the transmission signals are fed back to the respective transmission branches based on the calculated calibration value to correct the phase error and the amplitude error.

CITATION LIST

Patent Literature

Patent Literature 1: JP-A-2005-348236

SUMMARY OF INVENTION

Technical Problem

The present inventors studied a phased array transmission device that can cope if there is an error occurring in phases and amplitudes of respective transmission branches. However, in the related art technique that uses a phased array, it is difficult to obtain a phased array transmission device that sufficiently copes if there is an error occurring in phases and amplitudes of respective transmission branches.

An object of the present disclosure is to provide a technique that is capable of correcting a phase error and an amplitude error of transmission signals between transmission branches with a simple configuration while suppressing increase in circuit size and power consumption, in wireless communication using a phased array antenna.

Solution to Problem

The present disclosure provides a phased array transmission device including: a first transmission branch and a second transmission branch, each including: a transmitter, configured to transmit a transmission signal in a wireless frequency; a phase adjuster, configured to adjust a phase of the transmission signal; an amplitude adjuster, configured to adjust an amplitude of the transmission signal; an antenna section, configured to radiate an output signal from the transmitter into a space; and a coupler section, configured to extract a part of an output from the transmitter; a first branch detector and a second branch detector, configured to detect levels of outputs from the coupler sections of the first and second transmission branches, respectively; a signal combining section, configured to combine outputs from the coupler sections of the first and second transmission branches; a combination detector, configured to detect a level of an output from the signal combining section; an amplitude controller, configured to control the amplitude adjuster according to the outputs detected by the first and second branch detectors; and a phase controller, configured to control the phase adjuster according to the output detected by the combination detector.

According to this configuration, it is possible to correct a phase error and an amplitude error of the transmission signals between the transmission branches with a simple configuration while suppressing increase in circuit size and power consumption, and to form a transmission beam with high accuracy in a phased array antenna.

Advantageous Effects of Invention

According to the present disclosure, it is possible to correct a phase error and an amplitude error of transmission signals between transmission branches with a simple configuration while suppressing increase in circuit size and power consumption, in wireless communication using a phased array antenna.

DESCRIPTION OF EMBODIMENT

Background of First to Fourth Embodiments

Phases and amplitudes of respective transmission branches are controlled with high accuracy. However, if an error occurs in the phases and amplitudes, for example, the shape of a beam is collapsed, and thus, a strong beam occurs in addition to a main beam, which causes degradation of characteristics.

Thus, in wireless communication using a phased array antenna, it is necessary to provide a technique that corrects the error, in a case where an error occurs in control of phases and amplitudes between transmission branches. The error may be caused by various factors such as performance variation of components used for circuit mounting, process unevenness for integrated circuits, variation due to usage environments (temperature, for example), or performance variation of power sources used in respective transmission branches.

Further, for example, a phased array antenna device disclosed in Reference Patent Literature 1 mentioned below includes a correction phase storage unit that stores correction phase information and a correction phase indicating circuit that acquires information relating to a delay time of each real-time delay phase shifter and indicates a correction phase according to the delay time of each real-time delay phase shifter, and corrects a phase error between respective transmission branches by the phase shifter and a delay unit.

(Reference Patent Literature 1) JP-A-2002-76743

However, in the related art example disclosed in Reference Patent Literature 1, since the phase error and an amplitude error between the respective transmission branches are respectively detected, a reception system for calibration that down-converts a loopback signal of a transmission system and performs an FFT calculation to detect the phase error is further provided. Thus, the circuit size and power consumption are increased.

Hereinafter, embodiments of a phased array transmission device according to the present invention will be described. In the following embodiments, the same components are given the same reference signs, and description thereof will not be repeatedly made. Herein, a wireless transmission device that uses a phased array antenna technique (a wireless transmission device using a phased array antenna) is referred to as the "phased array transmission device".

First Embodiment

Figure 1:
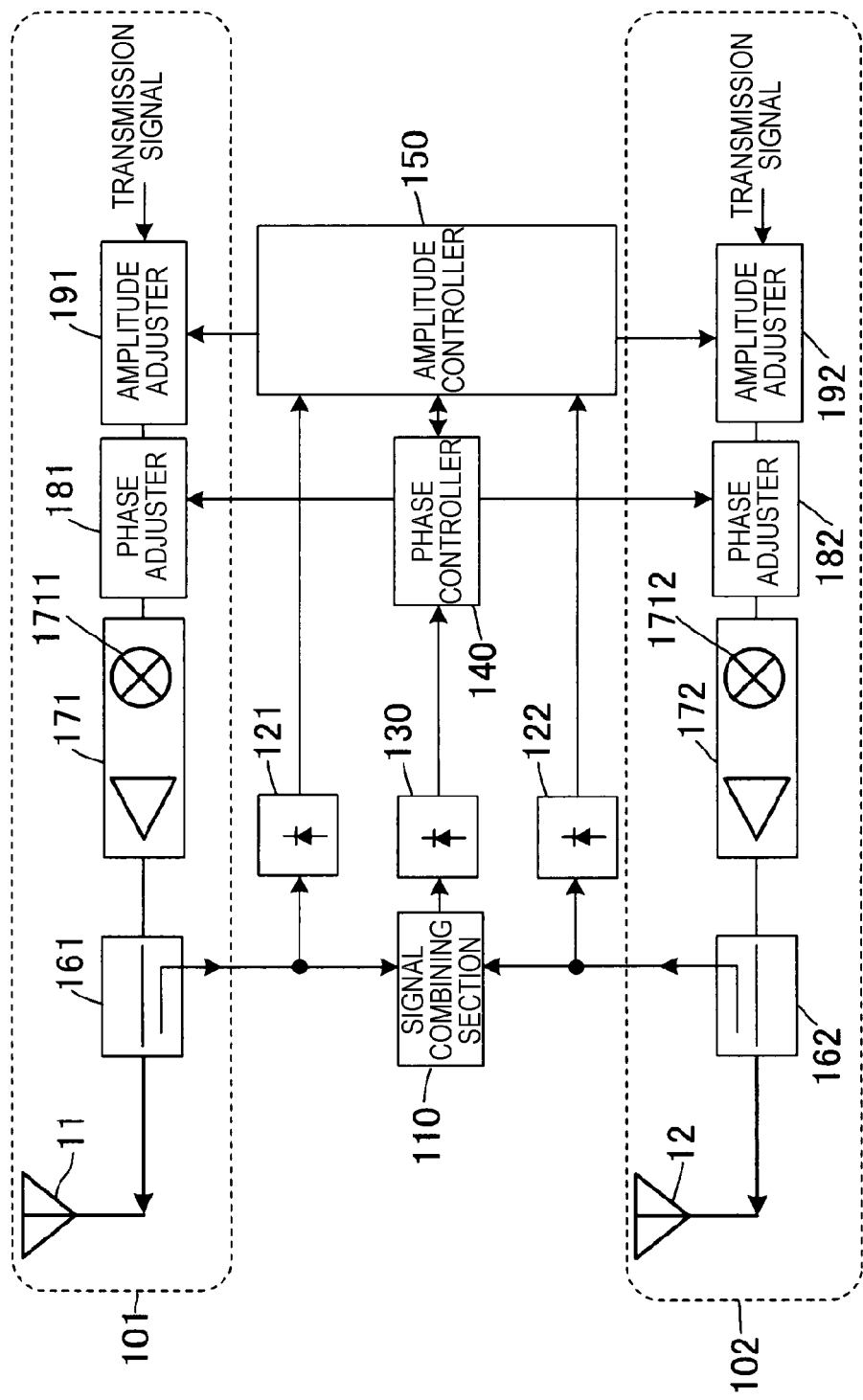
FIG. 1 is a block diagram illustrating a configuration of a phased array transmission device according to a first embodiment.

FIG. 1 is a block diagram illustrating a configuration of a phased array transmission device according to a first embodiment of the present invention. In the first embodiment, a configuration example in which two transmission branches are provided as a plurality of parallel transmission systems is shown. Here, a configuration in which three or more transmission branches are provided may be also used.

The phased array transmission device of the first embodiment includes transmission branches 101 and 102, a signal combining section 110, branch detectors 121 and 122, a combination detector 130, a phase controller 140, and an amplitude controller 150.

The transmission branches 101 and 102 have the functions of supplying a transmission signal to each of a plurality of antennas in the phased array transmission device, modulating the transmission signal and performing up-conversion into a wireless frequency signal. The respective transmission branches 101 and 102 have the same configuration.

That is, the transmission branch 101 includes an antenna section 11, a coupler section 161, a transmitter 171, a phase adjuster 181, and an amplitude adjuster 191; and the transmission branch 102 includes an antenna section 12, a coupler section 162, a transmitter 172, a phase adjuster 182, and an amplitude adjuster 192.

The antenna sections 11 and 12 radiate a transmission signal into the space, and form an array antenna by a plurality of antennas. In the phased array antenna, the shape of a transmission beam is theoretically determined by the directionality of an antenna unit, the arrangement relationship of the plurality of antennas, and the level and phase of a transmission signal supplied to each antenna.

The coupler sections 161 and 162 are provided in the vicinity of antenna ends in front of the respective antenna sections 11 and 12, and have the function of extracting a part of the supplied transmission signal. In consideration of quality degradation of the transmission signal, the level of extraction is set to be about 1/10 or lower compared with the transmission signal. With respect to a high frequency transmission signal, the coupler sections 161 and 162 may be realized by a distributed coupled line that is electrically or magnetically coupled to a transmission line of the transmission signal, or a passive circuit including a capacitor of a relatively small capacitance value, an inductor and a transformer.

The transmitters 171 and 172 include high frequency circuits (RF circuits) called power amplifier and mixer circuits 1711 and 1712, and have the functions of modulating the transmission signal and performing up-conversion into a wireless frequency band.

The phase adjusters 181 and 182 have the function of adjusting the phase of the transmission signal in each of the transmission branches 101 and 102, and are realized by a phase shifter, for example. In the phased array transmission device, a phase necessary in each transmission branch is theoretically determined from a necessary specification of the shape and direction of a transmission beam and the amount of side lobe suppression, but the phase is adjusted by the phase adjusters 181 and 182 to obtain a necessary phase shift amount.

The phase adjustment of the transmission signal may be performed for either of a baseband signal or a wireless frequency signal. Further, the phase adjustment may be performed for a locally-generated signal used in up-converting a baseband signal.

That is, the phase adjusters 181 and 182 may be provided in a circuit of a baseband bandwidth like an example shown in the figure, or may be provided in a circuit of a wireless frequency baseband. That is, the phase adjusters 181 and 182 may be provided inside the transmitters 171 and 172, may be provided between the coupler sections 161 and 162 and the transmitters 171 and 172, or may be provided between locally-generated signal sources (not shown) and the up-conversion mixer circuits 1711 and 1712 provided in the transmitters 171 and 172.

Amplitude adjusters 191 and 192 have the function of adjusting oscillation of the transmission signal in each transmission branch 101 and 102, and are realized by circuits of a variable gain amplifier and a variable attenuator, for example. In the phased array transmission device, an amplitude necessary in each transmission branch is theoretically determined from a necessary specification of the shape and direction of a transmission beam and the amount of side lobe suppression, but the amplitude is adjusted by the amplitude adjusters 191 and 192 to obtain a necessary signal level (amplitude).

The amplitude adjustment of the transmission signal may be performed for either of a baseband signal or a wireless frequency signal. Further, the amplitude adjustment may be performed for a locally-generated signal used in up-converting a baseband signal.

That is, in a similar manner to the phase adjusters 181 and 182, the amplitude adjusters 191 and 192 may be provided in the circuit of the baseband bandwidth like the example shown in the figure, or may be provided in the circuit of the wireless frequency baseband. That is, the amplitude adjusters 191 and 192 may be provided inside the transmitters 171 and 172, may be provided between the coupler sections 161 and 162 and the transmitters 171 and 172, or may be provided between the locally-generated signal sources (not shown) and the up-conversion mixer circuits 1711 and 1712 provided in the transmitters 171 and 172.

Further, the arrangement order of the transmitters 171 and 172, the phase adjusters 181 and 182 and the amplitude adjusters 191 and 192 is not limited to the other shown in the figure, and may be in any arrangement order.

The signal combining section 110 is connected to extraction output terminals of the coupler sections 161 and 162, and has the function of adding extracted signal outputs of the coupler sections 161 and 162. The signal combining section 110 is realized by a passive circuit called a Wilkinson power combiner that combines powers of two signals, for example.

An output of the signal combining section 110 has a maximum amplitude when the signals input from the coupler sections 161 and 162 have the same amplitude and the same phase. On the other hand, when two signals input from the coupler sections 161 and 162 have the same amplitude and reverse phases, that is, if a phase difference is 180 degrees, the output of the signal combining section 110 is zero.

The branch detectors 121 and 122 are connected to extraction output terminals of the coupler sections 161 and 162, and have the functions of measuring transmission output levels of the respective transmission branches 101 and 102 by detecting the outputs of the coupler sections 161 and 162, respectively. The branch detectors 121 and 122 are realized by a simple and low-power circuit called a squared detector using a diode or an FET, for example. Further, the branch detectors 121 and 122 may employ a combination of an amplifier and a detector as necessary, to thereby improve detection performance.

The combination detector 130 is connected to an output terminal of the signal combining section 110, and has the function of detecting and measuring an output level of the signal combining section 110. The combination detector 130 is realized by a simple and low-power circuit called a squared detector using a diode or an FET, for example, in a similar manner to the branch detectors 121 and 122. Further, the combination detector 130 may employ a combination of an amplifier and a detector as necessary, to thereby improve detection performance.

The phase controller 140 is connected to an output terminal of the combination detector 130 and the amplitude controller 150, and has the function of controlling the phase adjusters 181 and 182 that are provided in the respective transmission branches 101 and 102 according to an output of the combination detector 130. The phase controller 140 adjusts a phase shift amount in the phase adjusters 181 and 182 according to information about a phase shift amount calculated based on a desired transmission beam specification, to thereby adjust the phases of the transmission signals of the respective transmission branches 101 and 102.

Further, the phase controller 140 finely adjusts the phase adjusters 181 and 182 so that a phase error between the respective transmission branches is corrected based on output information from the combination detector 130 and amplitude control information from the amplitude controller 150. The phase controller 140 has a phase correction table that retains information about the phase shift amount in the phase adjusters 181 and 182. The phase correction table may be provided in the phase adjusters 181 and 182.

The amplitude controller 150 is connected to output terminals of the branch detectors 121 and 122, and has the function of controlling the amplitude adjusters 191 and 192 that are provided in the respective transmission branches 101 and 102 according to outputs of two branch detectors 121 and 122. The amplitude controller 150 adjusts levels in the amplitude adjusters 191 and 192 according to information about an amplitude amount calculated based on the desired transmission beam specification, to thereby adjust the levels (amplitudes) of the transmission signals of the respective transmission branches 101 and 102.

Further, the amplitude controller 150 is operated to finely adjust the amplitude adjusters 191 and 192 so that an amplitude error between the transmission branches is corrected based on output information from the branch detectors 121 and 122. Further, the amplitude controller 150 delivers amplitude control information and phase control information between the phase controller 140 and the amplitude controller 150. The amplitude controller 150 has a phase correction table that retains information about an amplitude adjustment amount in the amplitude adjusters 191 and 192. The amplitude correction table may be provided in the amplitude adjusters 191 and 192.

The phase controller 140 and the amplitude controller 150 may be realized by digital signal processing using an information processing circuit that includes a processor and a memory, and may realize respective functions by executing a predetermined process by operating a software program in the processor.

The functions of level detection of a detector output from the combination detector 130 in the phase controller 140 and level detection of detector outputs from the branch detectors 121 and 122 in the amplitude controller 150 are realized by an ADC (A-D converter) circuit, for example. The phase controller 140 and the amplitude controller 150 compare information about the detection level that is digital-converted with a threshold value that is stored in advance, or stores the output values for a predetermined period of time to output a maximum value during the period, to thereby perform level detection.

In the present embodiment, the procedure of error correction relating to the phase error and the amplitude error between the respective transmission branches will be described.

As a first process, the amplitude controller 150 adjusts the amplitude adjusters 191 and 192 to conform the transmission output levels of the transmission branch 101 and the transmission branch 102 each other. The amplitude controller 150 compares a detection output of the branch detector 121 with a detection output of the branch detector 122 and checks whether the results are the same.

In a case where two detection outputs are not the same, since an amplitude characteristic error is present between the transmission branches, the amplitude controller 150 finely adjusts one or both of the amplitude adjuster 191 and the amplitude adjuster 192 to conform two detection output levels each other, to thereby correct the amplitudes of the transmission signals. Here, for example, in a state where one of the amplitude adjusters 191 and 192 is fixed as a reference, the other one thereof is finely adjusted.

As a second process, in a state where the transmission output levels of the transmission branch 101 and the transmission branch 102 are the same, the phase controller 140 adjusts the phase adjusters 181 and 182 so that the phases of two transmission branches are the same.

The phase controller 140 stores the detection output of the combination detector 130 as an output from an ADC (not shown), finely adjusts one or both of the phase adjuster 181 and the phase adjuster 182, and selects an adjustment amount where the detection output of the combination detector 130 becomes maximum.

The adjustment amount where the detection output of the combination detector 130 becomes maximum corresponds to an in-phase condition that the phase characteristics between the transmission branches are the same, and also corresponds to the phase error in the respective transmission branches.

Further, for example, in a state where one of the phase adjusters 181 and 182 is fixed as a reference, the other one thereof may be finely adjusted, to thereby easily perform the adjustment.

As a third process, in a state where the output transmission level of the transmission branch 101 and the output transmission level of the transmission branch 102 are the same, the phase controller 140 adjusts the phase adjusters 181 and 182 so that the phases of two transmission branches are reverse phases.

The phase controller 140 stores the detection output of the combination detector 130 as an output from the ADC (not shown), finely adjusts one or both of the phase adjuster 181 and the phase adjuster 182, and selects an adjustment amount where the detection output of the combination detector 130 becomes minimum.

The adjustment amount where the detection output of the combination detector 130 becomes minimum corresponds to an anti-phase condition that the phase characteristics between the transmission branches have a difference of 180 degrees, and also corresponds to the phase error in the respective transmission branches.

Further, for example, in a state where one of the phase adjusters 181 and 182 is fixed as a reference, the other one thereof may be finely adjusted, to thereby easily perform the adjustment.

As a fourth process, the phase controller 140 creates or updates the phase correction table for adjustment of the phase error in the respective transmission branches. The phase controller 140 calculates the phase error present in the respective transmission branches based on the adjustment amounts for obtaining the in-phase condition and the anti-phase condition, obtained in the second and third processes to generate or update correction data of the phase correction table. That is, by storing the adjustment amounts in the correction table as an inter-branch phase error and applying the adjustment amounts in a case where an arbitrary phase shift amount is set, it is possible to perform accurate phase adjustment.

The adjustment amount obtained in the second process is basically the same as the adjustment amount obtained in the third process. Accordingly, it is possible to evaluate validity of the adjustment amount obtained in the second process by the third process. For example, in a case where the phase error of the branches varies due to the factor of non-linearity of the phase adjusters 181 and 182, the validity evaluation is effective. In this case, by selecting the correction data with respect to each of the in-phase condition and the anti-phase condition and by performing interpolation for phase setting between 0 degree and 180 degrees based on the two pieces of correction data, it is possible to calculate correction data.

Further, the amplitude controller 150 creates or updates the amplitude correction table for adjustment of the amplitude error in the respective transmission branches. The amplitude controller 150 generates or updates correction data of the amplitude correction table based on the amplitude error present in the respective transmission branches, obtained by the fine adjustment result of the amplitude in the first process.

For example, in the first process, first, in a case where the amplitude adjusters 191 and 192 are set so that the transmission output levels of the transmission branches 101 and 102 are the same but the outputs of the branch detectors 121 and 122 are not the same, the amplitude controller 150 determines that the amplitude error occurs between the branches. Next, the amplitude controller 150 determines an adjustment amount for adjustment of one or both of the amplitude adjusters 191 and 192 so that the outputs of the branch detectors 121 and 122 are the same. This adjustment amount becomes the correction data of the amplitude error.

According to the above-described procedure, the error correction for the phase error and the amplitude error between the respective transmission branches is performed. Thereafter, by controlling the phase adjusters 181 and 182 and the amplitude adjusters 191 and 192 based on the phase correction table and the amplitude correction table with respect to the respective transmission branches 101 and 102, it is possible to form a transmission beam in which the errors between the transmission branches are suppressed in the phase and amplitude adjustment for obtaining desired beam directionality.

In a real use, for example, values of the errors between the transmission branches may vary according to an environmental change, and thus, it is effective to periodically execute the error correction procedure.

In a case where the phase error varies according to the amplitudes of the transmission signals in the transmission branches 101 and 102, the phase error may be calculated for correction for each amplitude necessary in a real use. Further, in a case where the phase shift characteristics in the phase shifters of the phase adjusters 181 and 182 are non-linear, the phase error may be calculated for correction for each phase shift amount necessary in a real use.

Further, even in a case where any one of the second process and the third process is performed, it is possible to calculate the amplitude error and the phase error for correction. Here, it is preferable to perform both of the second and third processes to enhance the reliability of the information of the correction tables.

As described above, in the first embodiment, the signal combining section 110 and the plurality of detectors including the branch detectors 121 and 122 and the combination detector 130 are provided to detect and adjust the phase error and the amplitude error between the plurality of transmission branches.

Thus, according to the present embodiment, it is possible to detect the errors of the amplitude and phase characteristics between two transmission branches by the configuration that uses the signal combining section and the detectors capable of being mounted with a small size and low power, and to correct the phase error and the amplitude error by the simple procedure. Thus, it is possible to realize a phased array transmission device that detects and corrects the errors of the amplitude and phase characteristics in the respective transmission branches with a simple configuration as a whole.

Further, since a part of the transmission signal from each transmission branch is extracted by the coupler sections 161 and 162, it is possible to suppress influence of impedance change in switching on a characteristic of a transmission wave with respect to a high frequency transmission signal, differently from a configuration in which a transmission branch to be measured is exchanged by a switch.

Further, since a reception system for calibration is not necessary, it is possible to suppress increase in circuit size, power consumption and cost due to the reception system of high accuracy.

Further, since it is not necessary to acquire in advance correction information about a phase error in a transmission system by a certain method and to store the correction information in a correction phase storage unit, it is possible to cope with a dynamic change such as an error change due to change in the environment (for example, temperature).

Further, since the amplitude adjusters 191 and 192 are provided as correction means with respect to the amplitude error, it is possible to suppress side lobe degradation in a similar manner to the phase error.

As a result, in the phased array transmission device of the present embodiment, by calibrating the phase and amplitude adjustments between the transmission branches, it is possible to obtain desired beam directionality, and to suppress degradation of the amount of side lobe suppression. According to the configuration of the present embodiment, it is possible to mount additional circuits necessary for correction with a small size, low cost and low power, and to enhance mounting performance in forming the circuits as a chip.

Second Embodiment

Figure 2:
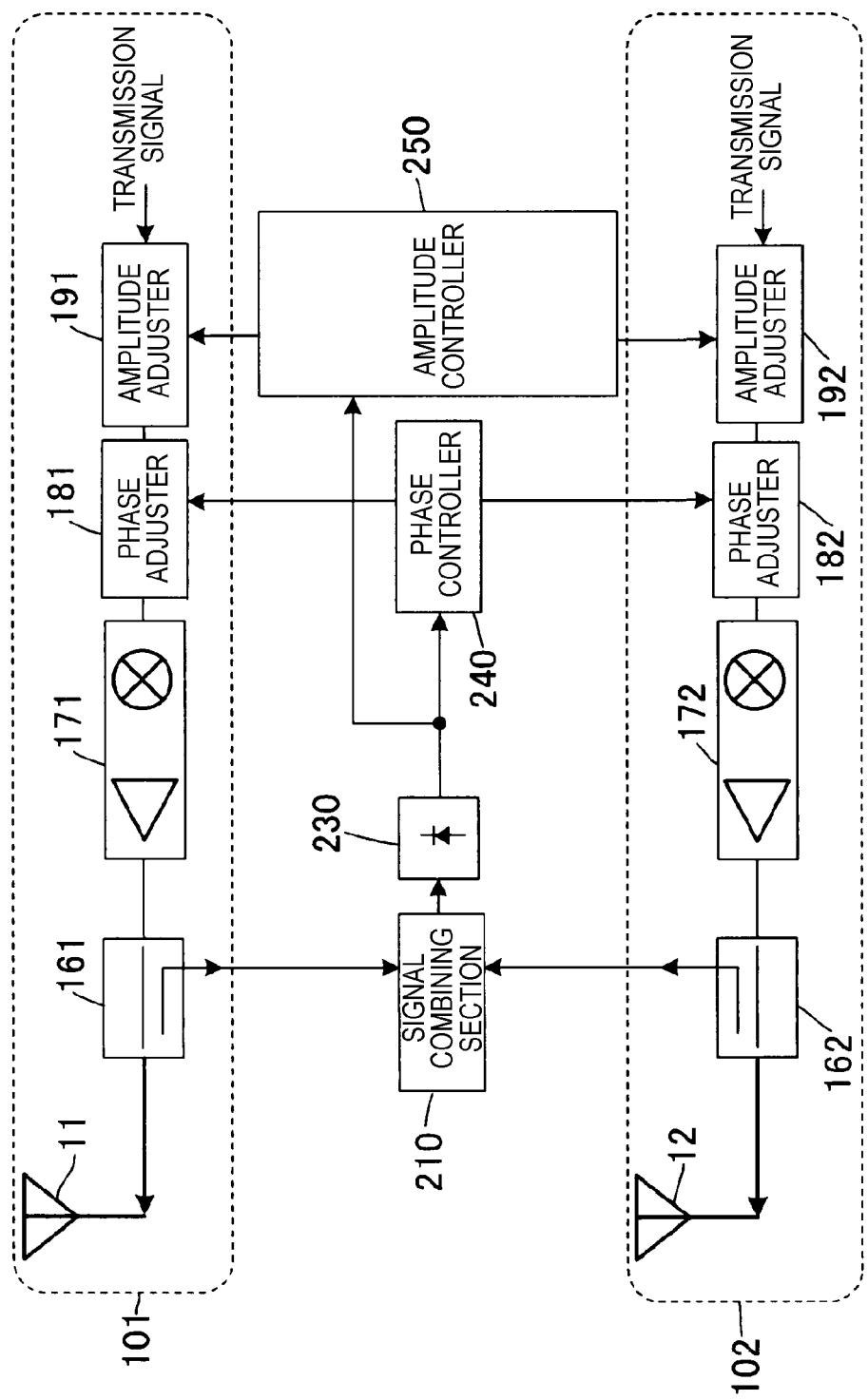
FIG. 2 is a block diagram illustrating a configuration of a phased array transmission device according to a second embodiment.

FIG. 2 is a block diagram illustrating a configuration of a phased array transmission device according to a second embodiment of the present invention. In the second embodiment, a configuration example is shown in which the branch detectors are removed from the configuration of the first embodiment shown in FIG. 1. The second embodiment may be applied to a configuration in which three or more transmission branches are provided.

The phased array transmission device of the second embodiment has a configuration in which the branch detectors 121 and 122 are not provided, in which an output terminal of a combination detector 230 is connected to a phase controller 240 and an amplitude controller 250 and an output of the combination detector 230 is input to the respective controllers. The other configuration is the same as in the first embodiment, and thus, description thereof will not be repeatedly made.

The combination detector 230 has the functions of the branch detectors 121 and 122 in addition to the function of the combination detector 130 according to the first embodiment. The combination detector 230 may be formed by a detector circuit using a diode or an FET, for example, on a mounting surface, in a similar manner to the first embodiment.

A basic operation of the second embodiment is similar to that of the first embodiment, and thus, a part thereof different from that of the first embodiment will be mainly described herein.

In an error correction procedure relating to a phase error and an amplitude error between the respective transmission branches, as a first process, in a case where transmission output levels of the respective transmission branches 101 and 102 are checked, the amplitude controller 250 operates one transmission branch for transmission and detects a signal level of the transmission branch during operation with reference to an output of the combination detector 230.

Further, the amplitude controller 250 sequentially operates all the transmission branches, and detects signal levels thereof to perform level detection of all the transmission branches. Then, the amplitude controller 250 compares the levels of all the transmission branches to detect an amplitude error between the branches. Then, the amplitude controller 250 adjusts the amplitude adjusters 191 and 192 so that the transmission output levels of the transmission branch 101 and the transmission branch 102 are the same.

Thereafter, the second to fourth processes are the same as in the first embodiment. As the second process, in a state where the transmission output levels of the transmission branch 101 and the transmission branch 102 are the same, the phase controller 240 adjusts the phase adjusters 181 and 182 to conform the phases of two transmission branches. Further, as the third process, in a state where the transmission output levels of the transmission branch 101 and the transmission branch 102 are the same, the phase controller 240 adjusts the phase adjusters 181 and 182 so that the phases of two transmission branches are reverse. Further, as the fourth process, the phase controller 240 creates or updates a phase correction table for phase adjustment, and the amplitude controller 250 creates or updates an amplitude correction table for amplitude adjustment.

In the second embodiment, since the level detection is sequentially performed, it takes more time for the error correction for sequential level detection, compared with the configuration of the first embodiment in which the transmission output levels of the respective transmission branches are detectable at the same time. However, it is possible to form an error detection system using a smaller number of detectors. Thus, it is possible to detect and correct the phase error and the amplitude error with a simple configuration.

As described above, according to the second embodiment, it is possible to detect errors of the amplitude and phase characteristics between two transmission branches with a simple configuration compared with the first embodiment, and to correct the phase error and the amplitude error by a simple procedure. Thus, it is possible to realize a phased array transmission device that detects and corrects the errors of the amplitude and phase characteristics in the respective transmission branches with a simple configuration as a whole.

Third Embodiment

Figure 3:
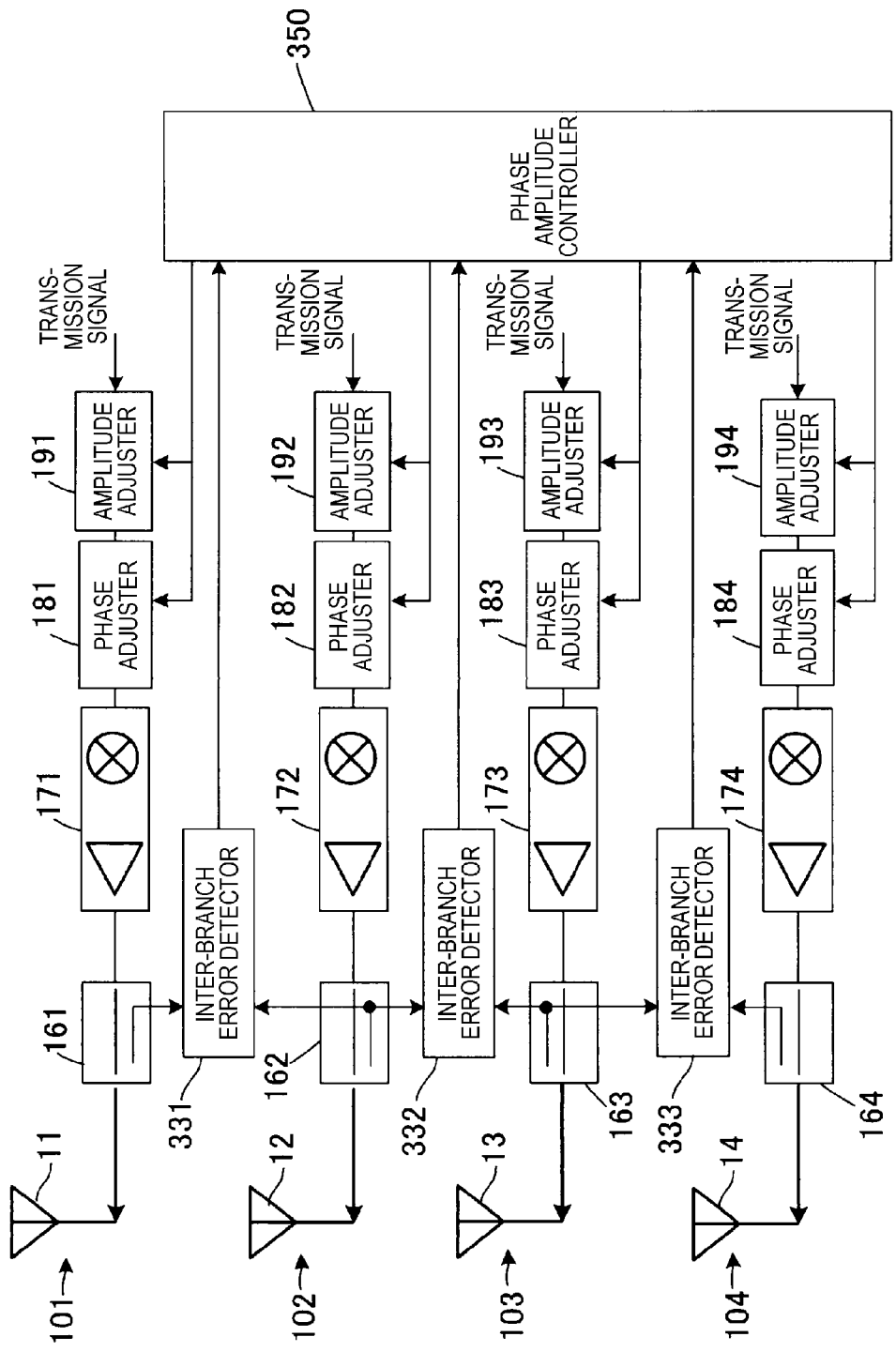
FIG. 3 is a block diagram illustrating a configuration of a phased array transmission device according to a third embodiment.

FIG. 3 is a block diagram illustrating a configuration of a phased array transmission device according to a third embodiment of the present invention. In the third embodiment, a configuration example is shown in which three or more transmission branches are provided in the configuration of the first embodiment shown in FIG. 1.

In FIG. 3, a configuration example in which four transmission branches are provided is shown. That is, respective transmission branches 101 to 104 respectively have antenna sections 11 to 14, coupler sections 161 to 164, transmitters 171 to 174, phase adjusters 181 to 184, and amplitude adjusters 191 to 194. The configuration of each of the transmission branches 101 to 104 is the same as in the first embodiment, and description thereof will not be repeatedly made.

Further, inter-branch error detectors 331, 332 and 333 are respectively provided between two transmission branches, and a phase and amplitude controller 350 is provided that controls the phase adjusters 181 to 184 and the amplitude adjusters 191 to 194 of the respective transmission branches. The phase and amplitude controller 350 has the functions of a phase controller and an amplitude controller.

A basic operation thereof is the same as in the first embodiment. Hereinafter, operations of the inter-branch error detectors 331 to 333 and the phase and amplitude controller 350 in the third embodiment will be described.

Each of the inter-branch error detectors 331 to 333 includes the signal combining section 110, the branch detectors 121 and 122, and the combination detector 130 in the first embodiment. The inter-branch error detectors 331 to 333 combine signals extracted from two adjacent transmission branches, detect a combined signal, and output the combined and detected output to the phase and amplitude controller 350.

For example, in a case where N transmission branches are present, (N−1) combined and detected outputs are output to the phase amplitude controller 350. Further, the inter-branch error detectors 331 to 333 detect the signals extracted from the respective transmission branches and output the result to the phase amplitude controller 350. For example, in a case where N transmission branches are present, N detected outputs are output to the phase amplitude controller 350.

The inter-branch error detectors 331 to 333 may have a configuration in which the branch detectors are not provided, the transmission signals of individual transmission branch are sequentially output without providing a branch detector and the signals extracted from the respective transmission branches are detected for output by the combination detector, in a similar manner to the second embodiment.

The phase and amplitude controller 350 detects and corrects a phase error and an amplitude error based on information on output signal levels of the respective transmission branches output by the inter-branch error detectors 331 to 333 and information on signal levels obtained by combining the signals between the adjacent transmission branches, according to the error correction procedure described in the first embodiment.

With respect to the phase error correction, by sequentially detecting the phase error between the adjacent transmission branches it is possible to detect the phase error of all the transmission branches. Accordingly, according to the present embodiment, the signal combining section and the combination detector may not be provided as an error detector with respect to all combinations (N×(N−1)/2), with respect to a phased array transmission system that includes N transmission branches, and it is possible to correct the phase error of the entire phased array transmission system by (N−1) signal combining sections and combination detectors. With respect to the amplitude error correction, N branch detectors are necessary as an error detector with respect to the phase array transmission system that has N transmission branches.

According to the third embodiment, in the phased array transmission device in which three or more antennas are used, it is possible to detect errors of the amplitude and phase characteristics between all the transmission branches in a similar manner to the first embodiment, and to correct the phase error and the amplitude error using a simple procedure. Thus, by controlling a large number of antennas, it is possible to realize a phased array transmission device that is capable of forming a beam of high directionality with high accuracy.

Fourth Embodiment

Figure 4:
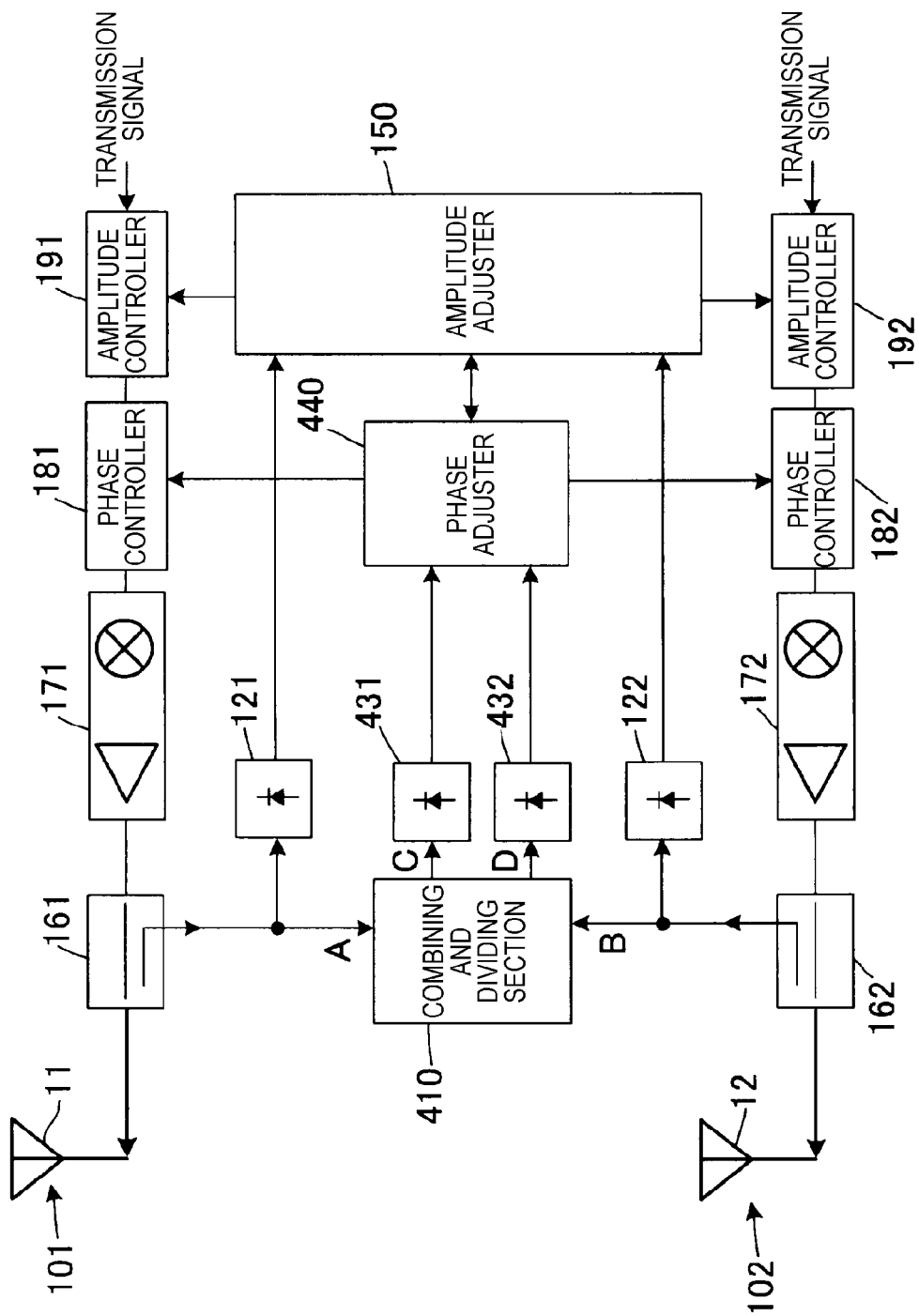
FIG. 4 is a block diagram illustrating a configuration of a phased array transmission device according to a fourth embodiment.

FIG. 4 is a block diagram illustrating a configuration of a phased array transmission device according to a fourth embodiment of the present invention. In the fourth embodiment, a configuration example is shown in which the configuration of the error detector between the transmission branches in the configuration of the first embodiment shown in FIG. 1 is changed. This configuration may be applied to a configuration in which three or more transmission branches are provided.

The phased array transmission device according to the fourth embodiment has a configuration in which the signal combining section 110 in the configuration in FIG. 1 is replaced with a combining and dividing section 410, the function of the signal combining section is changed to have two outputs, and two combination detectors 431 and 432 that respectively detect two outputs of the combining and dividing section 410 are provided. Output terminals of the combination detectors 431 and 432 are connected to a phase controller 440, and detection signals that indicate two output levels of the combining and dividing section 410 are input to the phase controller 440. Other configurations are the same as in the first embodiment, and description thereof will not be repeatedly made.

In a similar manner to the second embodiment, the phased array transmission device of the present embodiment may have a configuration in which the branch detectors are not provided, the transmission signals of individual transmission branches are sequentially output, and the signals extracted from the respective transmission branches are detected for output by the combination detector.

A basic operation thereof is the same as in the first embodiment. Hereinafter, operations of the combining and dividing section 410, the combination detectors 431 and 432 and the phase controller 440 in the fourth embodiment will be described.

The combining and dividing section 410 is configured by a 90-degree hybrid circuit, for example, and has two inputs A and B and two outputs C and D. A basic function of the 90-degree hybrid circuit is disclosed in Reference Literature 1 (Yoshihiro Konishi, "Jitsuyou Maikuro-ha Kairosekkei Gaido" ("Practical microwave circuit design guide"), Sogo Denshi Shuppansha, June 1996, p. 13 (First edition)), for example.

Figure 5:
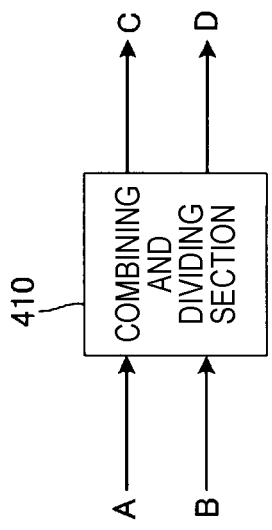
FIG. 5 is a diagram illustrating an operation of a combining and dividing section according to the fourth embodiment, in which (A) shows input and output terminals and (B) shows an example of a correspondence relationship between amplitudes and phases the respective input and output terminals.

FIG. 5 is a diagram illustrating an operation of the combining and dividing section 410 using the 90-degree hybrid circuit, in which (A) shows input and output terminals and (B)

shows an example of a correspondence relationship between amplitudes and phases of the respective input and output terminals. Here, the relationship with output signals in a case where two signals are input to the 90-degree hybrid circuit is shown.

In a case where the amplitudes of the input A and the input B are the same, a change occurs in the output C and the output D due to a phase relationship. In a case where the phases of the input A and the input B are the same, the amplitudes of the output C and the output D are the same. Further, in a case where the phases of the input A and the input B are shifted from each other, the amplitudes of the output C and the output D are different from each other. Thus, whether or not the phases of two signals of the input A and the input B are the same may be determined by whether or not the amplitudes of the output C and the output D are the same. Further, in a case where the phases of the input A and the input B are shifted from each other by 90 degrees, one of two outputs becomes zero.

The combination detectors 431 and 432 have the function of detecting and measuring the output levels of two outputs C and D of the combining and dividing section 410.

An error correction procedure in the fourth embodiment is different from the procedure shown in the first embodiment as follows.

In the fourth embodiment, in a second process, the phase controller 440 selects an adjustment amount in which the outputs of two combination detectors 431 and 432 connected to the combining and dividing section 410 are the same, to obtain an in-phase condition that the phases between the respective transmission branches are the same. Then, in a third process, the phase controller 440 adjusts the phase adjusters 181 and 182 so that the phase difference between two transmission branches is 90 degrees, and selects an adjustment amount in which one output of the combining and dividing section 410 is minimum, to obtain a condition that the difference of the phase characteristics between the transmission branches is 90 degrees.

According to the amounts of adjustment of the phase adjusters 181 and 182 performed in the above processes, it is possible to detect and correct the phase error between the transmission branches. The phase controller 440 calculates the phase error present in the respective transmission branches by information on a phase shift amount in which the in-phase condition and the 90-degree difference condition calculated in the second and third processes are obtained, and generates or updates correction data of a phase correction table.

In the configuration of the fourth embodiment, as described in the third process of the first embodiment, in a case where the phases of two transmission branches are set to have the phase difference of 180 degrees, since two outputs C and D of the combining and dividing section 410 are the same in FIG. 5, this case is not distinguished from a case where there is no phase difference between the transmission branches. However, since two outputs of the combining and dividing section 410 have an anti-phase relationship, if a configuration that combines and detects two output signals of the combining and dividing section 410 is additionally provided, it is also possible to determine the case where the phase difference between the transmission branches is 180 degrees.

According to the fourth embodiment, it is possible to detect errors of the amplitude and phase characteristics between the transmission branches in a case where the phase difference between the transmission branches is 90 degrees, compared with the first embodiment. Thus, it is possible to add phase correction information under the 90-degree difference condition to the phase correction table under the in-phase condition and the 180-degree difference condition obtained in the first embodiment. In particular, in a case where the phase control around the 90-degree phase difference is performed, it is possible to realize a phased array transmission device that is capable of correcting with high accuracy.

In the present embodiment, in the error correction procedure, both of the second process and the third process are performed to detect and correct the phase error between the transmission branches from two phase conditions, but even though any one process is performed, it is possible to detect and correct the phase error between the transmission branches.

Here, for example, it may be difficult to design the signal combining section or the combining and dividing section shown in the present embodiment as a circuit that ideally operates, and thus, an error may occur. However, since the above-mentioned circuit design error is estimated in advance, the amplitude adjuster and the phase adjuster may be controlled for correction in consideration of the design error.

In the present embodiment, in a phased array antenna transmission device that forms a beam using a phased array antenna that uses a plurality of antennas and radiates the beam into the air, in a case where amplitude and phase errors of high frequency signal characteristics between the respective transmission branches are corrected, it is possible to detect and correct the phase error and the amplitude error between the transmission branches.

Thus, it is possible to detect and correct both of the phase error and the amplitude error of the transmission signals between the transmission branches with a simple configuration while suppressing increase in circuit size and power consumption, that is, with a small circuit size and low power consumption.

By correcting the phase error and the amplitude error between the transmission branches, it is possible to form a transmission beam with high accuracy, and to enhance a directionality gain in a main beam direction, thereby making it possible to restrain a radiation level in an unnecessary direction. Thus, it is effective to control a communication area in wireless communication, to improve link budget, or to restrain clutter reflection or multipath in an unnecessary direction in a radar to enhance detection accuracy.

Further, in the phased array transmission device of the present embodiment, it is possible to mount the signal combining section and the detectors that detect the errors by a simple passive circuit. Thus, it is possible to realize low power consumption of the circuit, and it is possible to secure a high frequency transmission signal called a millimeter wave band. Accordingly, the phased array transmission device may be applied to a system that uses a high frequency. Further, in application to the high frequency band, it is possible to mount circuit parts that process a high frequency signal, such as the signal combining section, the detectors and the coupler sections, using a circuit suitable for integration, and to mount the entire system with a small size.

Background of Fifth to Tenth Embodiments

Further, the present disclosure relates to an inter-branch correction device of a phased array antenna that corrects an error between high frequency signals in respective branch systems provided corresponding to a plurality of antennas that forms a phased array antenna, and an inter-branch correction method of the phased array antenna.

Background Art

Recently, a phased array technique has been widely used in the field of communication as well as in the field of sensor technology that detects a target. In the phased array technique, a phased array antenna is formed using a plurality of antenna elements, and a phase component between signals in respective branch systems (hereinafter, referred to as "branches") provided corresponding to the respective antenna elements is controlled with high accuracy. Further, in the phased array technique, a phase component between high frequency signals in the respective branches may be controlled with high accuracy to form desired directionality.

In the phased array technique, since the directionality for a desired transmission direction of a transmission signal or a desired reception direction of a reception signal is formed with high accuracy, it is necessary to correct a phase variation between the high frequency signals in the respective adjacent branches. A technique that corrects a phase variation of signals is disclosed in Reference Patent Literature 2, for example, as follows.

An array antenna transmission device disclosed in Reference Patent Literature 2 includes an array antenna that is formed using a plurality of antenna elements, and divides a bandwidth of transmission signals into a plurality of blocks. The array antenna transmission device performs averaging using transmission signals in the divided blocks to calculate a calibration value that is common to the transmission signals in the same block. The array antenna transmission device corrects a phase variation that occurs between branches of a transmission circuit respectively provided corresponding to the plurality of antenna elements based on the calculated calibration value. According to this array antenna transmission device, it is possible to simplify a device configuration, and to realize calibration with high accuracy.

(Reference Patent Literature 2) JP-A-2005-348236

The present inventors studied a phased array transmission device that copes with high frequency signals (for example, millimeter waves) capable of being detected with high accuracy. However, with the phased array technique in the related art, it is difficult to obtain a phased array transmission device that sufficiently coped with high frequency signals (for example, millimeter waves) capable of being detected with high accuracy.

An advantage of some aspects of the present disclosure is to provide an inter-branch correction device of a phased array antenna that corrects a phase error between high frequency signals in respective branches provided corresponding to respective antennas that form a phased array antenna with high accuracy without increase in circuit size, and an inter-branch correction method.

Solution to Problem of the Present Disclosure

According to an aspect of the present disclosure, there is provided an inter-branch correction device of a phased array antenna including a plurality of branches that includes a modulator that modulates a baseband transmission signal, a delay section that delays the phase of the modulated transmission signal, a mixing section that converts the delayed transmission signal into a high frequency signal, and an antenna that receives the high frequency signal, the inter-branch correction device including: a high frequency converter that performs high frequency conversion based on two high frequency signals output from the respective adjacent branches; a filter section that extracts a DC component based on an output signal from the high frequency converter; and a delay controller that determines a predetermined phase delay amount in the delay section of the branch based on the DC component extracted by the filter section, in which the delay controller causes any delay section of the respective adjacent branches to delay the phase of the transmission signal modulated in the corresponding branch by the predetermined delay amount that is determined.

Further, according to another aspect of the present disclosure, there is provided an inter-branch correction method in an inter-branch correction device of a phased array antenna including a plurality of branches that includes a modulator that modulates a baseband transmission signal, a delay section that delays the phase of the modulated transmission signal, a mixing section that converts the delayed transmission signal into a high frequency signal, and an antenna that receives the high frequency signal, the inter-branch correction method including: a process of performing high frequency conversion based on two high frequency signals output from the respective adjacent branches; a process of extracting a DC component based on an output signal output from the high frequency conversion; a process of determining a predetermined phase delay amount in the delay section of the branch based on the extracted DC component; and a process of causing any delay section of the respective adjacent branches to delay the phase of the transmission signal modulated in the corresponding branch by the predetermined delay amount that is determined.

Advantageous Effects of the Present Disclosure

According to the present disclosure, it is possible to correct a phase error between high frequency signals in respective branches provided corresponding to respective antennas that form a phase array antenna with high accuracy without increase in circuit size.

Background of the Present Disclosure

If high frequency signals (for example, millimeter waves) capable of being detected with high accuracy are used in the phase array technique disclosed in Patent Literature 1 mentioned above, the high frequency signals are fed back through a switch element for switching branches that are measurement objects, and thus, the phases of the high frequency signals are considerably changed. Thus, in application of the high frequency signals (for example, millimeter waves) to the above-mentioned phased array technique, it is difficult to correct a phase variation between high frequency signals in respective branches with high accuracy.

Figure 16:
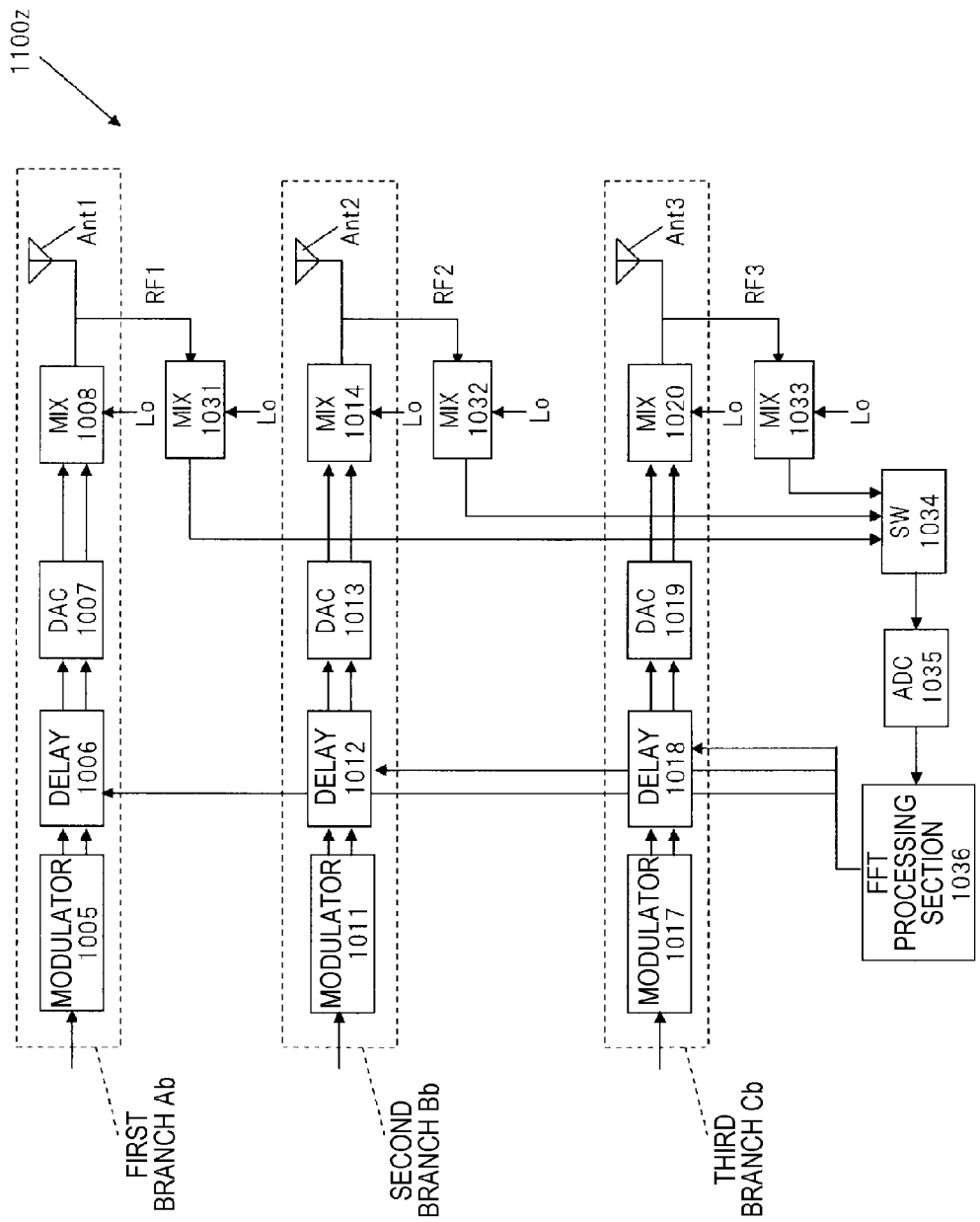
FIG. 16 is a block diagram illustrating an internal configuration of a transmission device of N branches that include N loopback paths of N high frequency signals and N down-conversion mixers.

In order to correct a phase variation between high frequency signals (for example, millimeter waves) in respective adjacent branches, a configuration disclosed in Reference Patent Literature 2 in which a switch element is not provided in a high frequency circuit section that receives an input of a high frequency signal is considered. As shown in FIG. 16, a transmission device 1100z of N branches (for example, N=3) is configured to include loopback paths for inputting N high frequency signals from the respective branches to a switch 1034 and N down-conversion mixers 1031 to 1033. Accordingly, it is possible to correct a phase variation that occurs between high frequency signals (for example, millimeter waves) in the respective adjacent branches with high accuracy FIG. 16 is a block diagram illustrating an internal configuration of a transmission device of N branches including loopback paths of N high frequency signals and N down-conversion mixers.

However, in the configuration shown in FIG. 16, it is necessary to provide multiple mixers 1008, 1014, 1020 and 1031 to 1033, a drive buffer that generates a local signal Lo used in each mixer, and an FFT (Fast Fourier Transform) processing section 1036 that analyzes the signal down-converted by each of the mixers 1031 to 1033. Thus, the circuit size of the transmission device 1100z is increased, and it is thus difficult to reduce power consumption in the entire circuit.

Hereinafter, embodiments of an inter-branch correction device of a phased array antenna and an inter-branch correction method of the phased array antenna according to the present disclosure will be described referring to the accompanying drawings.

Fifth Embodiment

Figure 6:
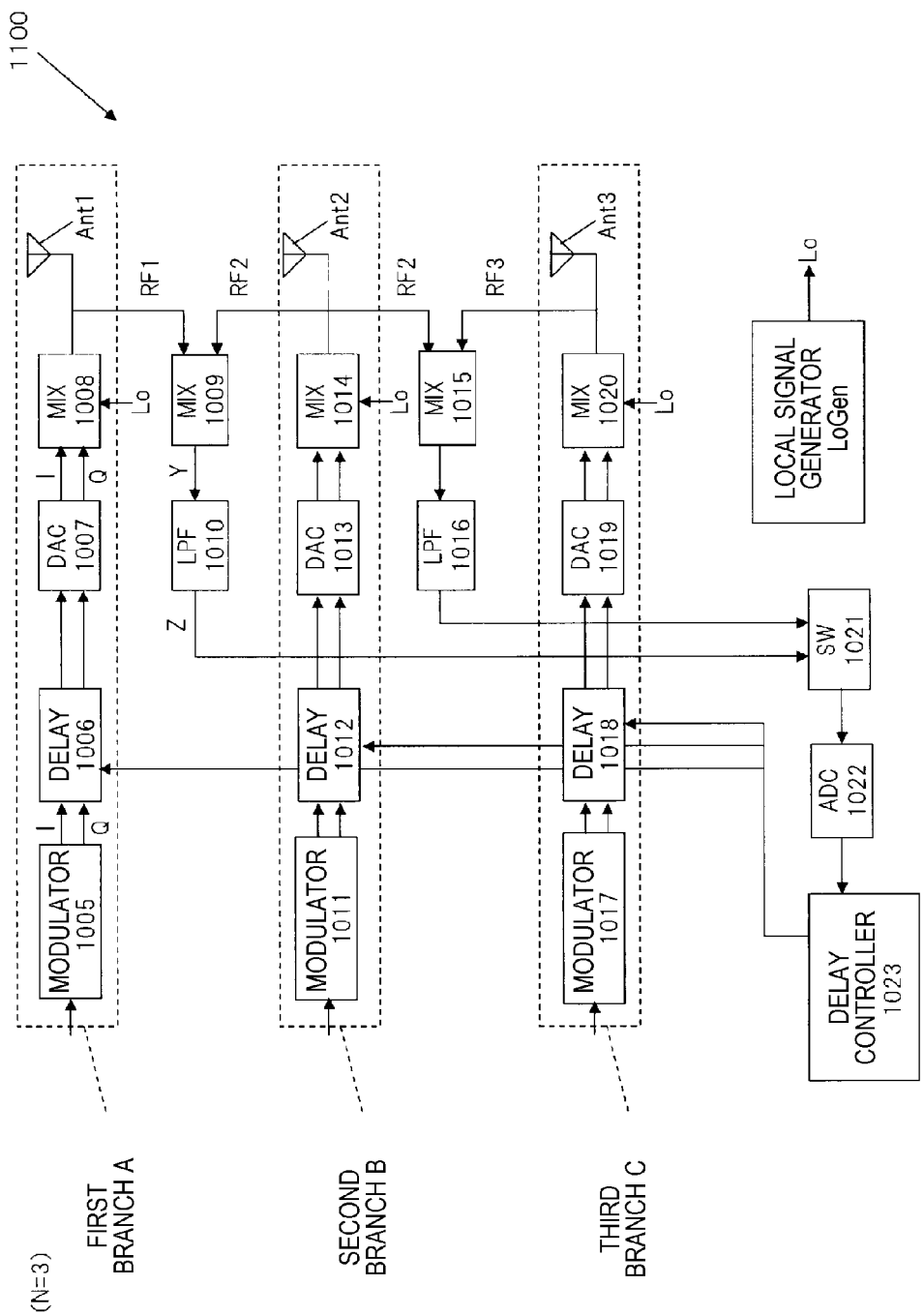
FIG. 6 is a block diagram illustrating an internal configuration of an inter-branch correction device of a phased array antenna according to a fifth embodiment.

FIG. 6 is a block diagram illustrating an internal configuration of an inter-branch correction device 1100 of a phased array antenna according to a fifth embodiment. First, configurations of respective components of the inter-branch correction device 1100 of the phased array antenna will be described.

The inter-branch correction device 1100 of the phased array antenna includes a first branch A, a second branch B and a third branch C that is a plurality of (N) transmission branch systems (hereinafter, referred to as "branches"), a mixer (MIX) 1009, a low pass filter (LPF) 1010, a mixer 1015, an LPF 1016, a switch (SW) 1021, an analog digital converter (ADC) 1022, a delay controller 1023, and a local signal generator LoGen.

In the inter-branch correction device of the phased array antenna in the following respective embodiments, a configuration in which a parameter N=3 is shown, but a natural number of 2 or more may be used as the parameter N, which is similarly applied to the other respective embodiments.

The first branch A includes a modulator 1005, a delay unit 1006 that serves as a delay section, a digital analog converter (DAC) 1007, a mixer 1008 that serves as a mixing section, and an antenna Ant1. Similarly, the second branch B includes a modulator 1011, a delay unit 1012 that serves as a delay section, a DAC 1013, a mixer 1014 that serves as a mixing section, and an antenna Ant2. Further, the third branch C includes a modulator 1017, a delay unit 1018 that serves as a delay section, a DAC 1019, a mixer 1020 that serves as a mixing section, and an antenna Ant3.

In the following respective embodiments, since the configurations and operations of the respective branches (the first branch A, the second branch B and the third branch C) are the same, the first branch A is described as an example.

Next, operations of the respective components of the inter-branch correction device 1100 of the phased array antenna will be described.

The inter-branch correction device 1100 of the phased array antenna determines a phase error that occurs between two high frequency signals RF1 and RF2 output from the first branch A and the second branch B by the delay controller 1023 based on the output signal of the LPF 1010. The inter-branch correction device 1100 of the phased array antenna delays, as a phase control in a baseband transmission signal of the first branch A or the second branch B based on the phase error determined by the delay controller 1023, the phase of the transmission signal. Accordingly, the inter-branch correction device 1100 of the phased array antenna is capable of canceling the phase error between the first branch A and the second branch B.

After canceling the phase error between the first branch A and the second branch B, the inter-branch correction device 1100 of the phased array antenna similarly determines a phase error that occurs between two high frequency signals RF2 and RF3 output from the second branch C and the third branch C by the delay controller 1023 based on the output signal of the LPF 1016. The inter-branch correction device 1100 of the phased array antenna delays, as a phase control in a baseband transmission signal of the second branch B or the third branch B based on the phase error determined by the delay controller 1023, the phase of the transmission signal. Accordingly, the inter-branch correction device 1100 of the phased array antenna is capable of canceling the phase error between the second branch B and the third branch C.

The delay control that is the phase control of the baseband transmission signal in the first branch A or the second branch B and the delay control that is the phase control of the baseband transmission signal in the second branch B or the third branch C are the same operation. In the following respective embodiments, the delay control that is the phase control of the baseband transmission signal in the first branch A or the second branch B will be described, and description of the delay control that is the phase control of the baseband transmission signal in the second branch B or the third branch C will be omitted.

The modulator 1005 modulates a baseband transmission signal input as a test signal for the delay control of the phase into a digital signal, for example, and transmits the baseband transmission signal that is formed using an in-phase signal (I signal) of an in-phase component and a quadrature signal (Q signal) of a quadrature component as a result of the digital modulation to the delay unit 1006.

The delay unit 1006 that serves as the delay section is configured using one or a plurality of flip flops or a finite impulse response (FIR) filter. In a case where the delay unit 1006 is configured using the FIR filter, it is possible to perform the delay control with high accuracy, compared with a case where the delay unit 1006 is configured using one or the plurality of flip flops.

The delay unit 1006 receives an input of the baseband transmission signal output from the modulator 1005, and delays the phase of the received transmission signal by a predetermined amount based on a delay control instruction (to be described later) output from the delay controller 1023. Here, the delay control instruction includes the delay amount of the phase delayed in the delay unit 1006. The delay unit 1006 outputs the transmission signal that is delayed in phase to the DAC 1007.

The DAC 1007 receives an input of the transmission signal output from the delay unit 1006, and converts the digital transmission signal into an analog transmission signal. The DAC 1007 outputs the analog transmission signal to the mixer 1008.

The mixer 1008 that serves as the mixing section receives an input of the analog transmission signal output from the DAC 1007, and up-converts the received transmission signal based on the local signal Lo supplied from the local signal generator LoGen. The mixer 1008 outputs the high frequency signal RF1 (for example, a millimeter wave) generated by the up-conversion to the antenna Ant1 and the mixer 1009, respectively. The high frequency signal RF1 output from the mixer 1008 is transmitted through the antenna Ant1.

The mixer 1009 that serves as a high frequency converter receives inputs of the high frequency signal RF1 output from the mixer 1008 of the first branch A and the high frequency signal RF2 similarly output from the mixer 1014 of the second branch B. The mixer 1009 performs a multiplication process for the received two high frequency signals RF1 and RF2, and outputs an output signal Y of the multiplication process to the LPF 1010.

The multiplication process in the mixer 1009 will be described using the following expressions. Two high frequency signals RF1 and RF2 are expressed by Expression (1) and Expression (2). Here, the baseband transmission signals output from the modulators (the modulator 1005, the modulator 1011 and the modulator 1017) of the respective branches (the first branch A, the second branch B and the third branch C) are continuous waves (CW waves) that are the same in phase at an angular velocity ω.

Expression 1

$$RF1 = \cos(\omega \cdot t + X) \quad (1)$$

Expression 2

$$RF2 = \cos(\omega \cdot t + \phi) \quad (2)$$

In Expression (1), a parameter X represents a variable of −180° to +180°, which is the phase delay amount in the delay unit 1006 of the first branch A. In the present embodiment, the delay controller 1023 delays the phase of the baseband transmission signal in the delay unit 1006, among the delay unit 1006 of the first branch A and the delay unit 1012 of the second branch B. Here, the delay controller 1023 may delay the phase of the baseband transmission signal by the delay unit 1012.

In Expression (2), a parameter φ represents a phase error that occurs between two high frequency signals RF1 and RF2 due to the up-conversion of the mixers 1008 and 1014 of the respective adjacent branches (the first branch A and the second branch B).

The mixer 1009 performs a multiplication process for two high frequency signals RF1 and RF2, and outputs the multiplication result Y to the LPF 1010 (see Expression (3)). In Expression (3), a parameter Y represents the multiplication result of two high frequency signals RF1 and RF2. In Expression (3), the multiplication result Y of the mixer 1009 includes a signal that is a sum component of a high frequency component that is two times the angular velocity ω and a DC component that does not depend on the angular velocity ω.

Expression 3

$$\begin{aligned} Y &= Mixout(RF1, RF2) \\ &= \cos(\omega \cdot t + C) \times \cos(\omega \cdot t + \phi) \\ &= \frac{1}{2}\{\cos(\omega \cdot t + \phi + \omega \cdot t + X) + \cos(\omega \cdot t + \phi - \omega \cdot t - X)\} \\ &= \frac{1}{2}\{\cos(2\omega \cdot t + \phi + X) + \cos(\phi - X)\} \end{aligned} \quad (3)$$

The LPF 1010 removes a signal of a high frequency component that exceeds a predetermined cutoff frequency. The LPF 1010 removes a component in the first term of Expression (3) that corresponds to the high frequency component from the multiplication result Y (see Expression (3)) of the mixer 1009, and outputs a signal Z of the DC component that does not depend on the angular velocity w to the switch 1021 (see Expression (4)). That is, in the inter-branch correction device 1100 of the phased array antenna, the output signal Z of the LPF 1010 becomes a fixed DC component of a low frequency in which the high frequency component (for example, a millimeter wave) is removed.

Expression 4

$$Z = \frac{1}{2} \cos(\phi - X) \quad (4)$$

The local signal generator LoGen generates the local signal Lo for up-conversion in the mixers (the mixer 1008, the mixer 1014 and the mixer 1020) of the respective branches (the first branch A, the second branch B and the third branch C). The local signal generator LoGen supplies the generated local signal Lo to the mixer 1008, the mixer 1014 and the mixer 1020 of the respective branches (the first branch A, the second branch B and the third branch C), respectively.

The switch 1021 switches connection between the LPF 1010 and the ADC 1022 or between the LPF 1016 and the ADC 1022 according to a switch control signal output from a switch controller (not shown). The switch 1021 connects the LPF 1010 and the ADC 1022 in a period when the phase in the baseband transmission signal of the first branch A or the second branch B is delayed. Accordingly, the output signal Z of the LPF 1010 is input to the ADC 1022.

Further, the switch 1021 connects the LPF 1016 and the ADC 1022 in a period when the phase in the baseband transmission signal of the second branch B or the third branch C is delayed. Accordingly, the output signal of the LPF 1016 is input to the ADC 1022.

The ADC 1022 receives an input of the output signal Z of the LPF 1010 through the switch 1021. The ADC 1022 converts the analog output signal Z received from the LPF 1010 into a digital output signal. The ADC 1022 outputs the digital output signal to the delay controller 1023.

The delay controller 1023 determines the phase delay amount of the baseband transmission signal in the delay unit 1006 of the first branch A or the delay unit 1012 of the second branch B based on the output signal Z (DC component) of the LPF 1010 converted by the ADC 1022. In the present embodiment, the inter-branch correction device 1100 of the phased array antenna delays the phase of the baseband transmission signal in the delay unit 1006 of the first branch A. Accordingly, the delay controller 1023 determines the phase delay amount of the baseband transmission signal in the delay unit 1006 of the first branch A based on the output signal Z of the LPF 1010 converted by the ADC 1022.

The delay controller 1023 outputs a delay control instruction including the determined phase delay amount to the delay unit 1006 or the delay unit 1012 of any one of the adjacent first branch A and second branch B. That is, the delay controller 1023 causes the delay unit 1006 or the delay unit 1012 of any one of the adjacent first branch A and second branch B to delay the phase of the baseband transmission signal modulated in the one branch by the determined phase delay amount.

In the present embodiment, the delay controller 1023 causes the delay unit 1006 of the first branch A among the adjacent first branch A and second branch B to delay the phase of the baseband transmission signal modulated in the modulator 1005 by the determined phase delay amount.

Figure 7:
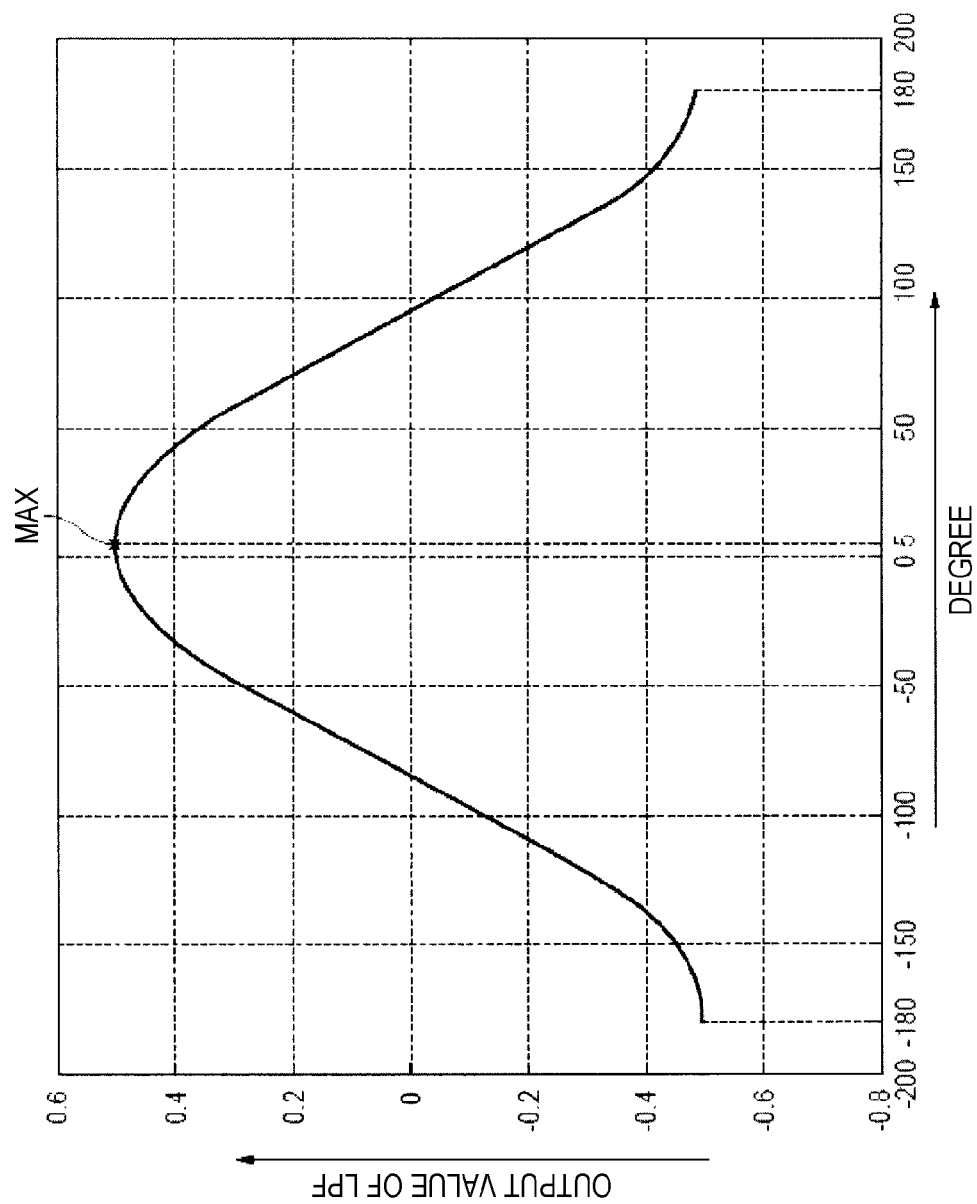
FIG. 7 is a graph illustrating a simulation result of the relationship between a phase delay amount in a delay unit of a first branch and an output signal of an LPF.

The determination of the phase delay amount in the delay controller 1023 will be described referring to FIG. 7. FIG. 7 is a graph illustrating a simulation result of the relationship between the phase delay amount in the delay unit 1006 of the first branch A and the output signal Z of the LPF 1010.

In FIG. 7, the transverse axis represents the parameter X (degrees) (see Expression (1)), and the longitudinal axis represents the output signal Z (DC component) of the LPF 1010. FIG. 7 shows a simulation result in a case where the phase error φ between the high frequency signal RF1 from the first branch A and the high frequency signal RF2 from the second branch B is 5°. In FIG. 7, the output signal Z of the LPF 1010 has a maximum value in a case where the phase component in Expression (4) is zero as the parameter X varies, that is, at X (=φ)=5°.

The delay controller 1023 determines the parameter X (5° in FIG. 7) in a case where the output signal Z of the LPF 1010 is the maximum value in FIG. 7 as the phase delay amount of the baseband transmission signal in the delay unit 1006. The delay controller 1023 causes the delay unit 1006 of the first branch A among the adjacent first branch A and second branch B to delay the phase of the baseband transmission signal modulated in the modulator 1005 by the determined phase delay amount (5°). The delay controller 1023 causes the delay unit 1012 of the second branch B not to delay the phase of the baseband transmission signal modulated in the modulator 1011.

Further, the delay controller 1023 may cause the delay unit 1012 of the second branch B among the adjacent first branch A and second branch B to delay the phase of the baseband transmission signal modulated in the modulator 1011 by a phase delay amount (−5°) corresponding to a reverse phase of the determined phase delay amount. The delay controller 1023 causes the delay unit 1006 of the first branch A not to delay the phase of the baseband transmission signal modulated in the modulator 1005.

As described above, the inter-branch correction device 1100 of the phased array antenna determines the phase delay amount in the delay unit 1006 or the delay unit 1012 based on the output signal of the LPF 1010 in two high frequency signals RF1 and RF2 output from the adjacent first branch A and second branch B. Further, the inter-branch correction device 1100 of the phased array antenna causes the delay unit 1006 or the delay unit 1012 to delay the phase of the baseband transmission signal modulated in each branch corresponding to the delay unit 1006 and the delay unit 1012 by the determined phase delay amount.

According to the inter-branch correction device 1100 of the phased array antenna with this configuration, it is possible to correct the phase error between the high frequency signals in the respective branches provided corresponding to the respective antennas that form the phased array antenna with high accuracy. Further, for the interbranch correction device 1100 of the phased array antenna, it is not necessary to provide the FFT processing section 1036, and it is possible to reduce the number of mixers, compared with the related art configuration shown in FIG. 16. Thus, according to the inter-branch correction device 1100 of the phased array antenna, it is possible to effectively reduce power consumption in the entire circuit of the inter-branch correction device 1100 of the phased array antenna without increase in circuit size.

Sixth Embodiment

In a sixth embodiment, a method of detecting the phase difference with high accuracy without using a high resolution ADC will be described.

In the configuration of the fifth embodiment, the phases between two high frequency signals that are respectively output from the adjacent branches do not coincide with each other, and for example, a phase error of 1° occurs when the parameter X=0° and the parameter φ=1°. In FIG. 7, with respect to the value of the output signal Z of the LPF 1010, the values of the respective output signals Z of the LPF 1010 corresponding to the parameter X=0° and the parameter X=1° show a value difference of about 0.015%.

In the determination of the delay controller 1023, there is a possibility that an error occurs in the determination of the maximum value of the output signal Z of the LPF 1010. Accordingly, in the ADC 1022 having the configuration of the fifth embodiment, it is necessary to analog-digital-convert (AD-convert) the output signal Z of the LPF 1010 with high accuracy, in order to increase the detection accuracy of the maximum value of the output signal Z of the LPF 1010.

On the other hand, for example, in a case where the parameter X=90° and the parameter φ=91°, the same phase error of 1° occurs. In FIG. 7, with respect to the value of the output signal Z (DC component) of the LPF 1010, the values of the respective output signals Z of the LPF 1010 corresponding to the parameter X=90° and the parameter X=91° show a value difference of about 1.745%.

Accordingly, the detection accuracy of the ADC 1022 that has a resolution of the same bits (for example, 7 bits) is about 100 times in the vicinity of the parameter X=90° compared with the vicinity of the parameter X=0°. That is, in the delay controller 1023, compared with a case where the maximum value of the output signal Z of the LPF 1010 is determined, in a case where the zero value of the output signal Z to which the phase error $ in the vicinity of 90° is given in advance between two high frequency signals is determined, it is possible to simply determine the phase error with high accuracy. The phase error in the vicinity of 90° is in the range of 90°±5°, for example.

In the sixth embodiment, if the phase error between two high frequency signals is in the vicinity of 0° (for example, 0° to 10°), an I signal and a Q signal of a baseband transmission signal modulated in the modulator of any branch of the respective adjacent branches are exchanged. By exchanging the I signal and the Q signal, the phase error between two high frequency signals output from the respective adjacent branches becomes (90°+φ). Thus, the ADC 1022 is able to determine the output signal Z of the LPF 1010 in the vicinity of the parameter φ=90° where the detection accuracy increases, with high accuracy.

Figure 8:
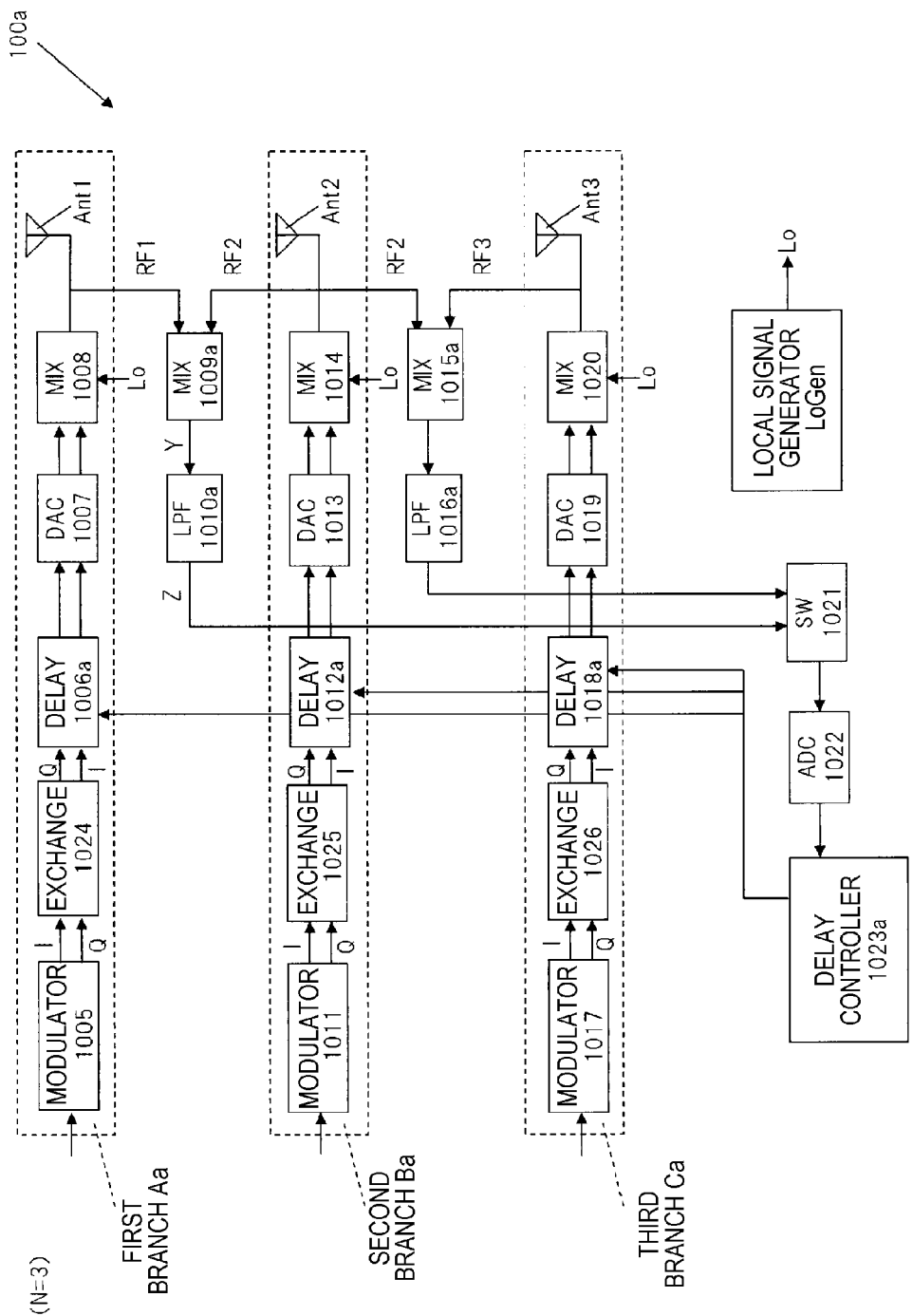
FIG. 8 is a block diagram illustrating an internal configuration of an inter-branch correction device of a phased array antenna according to a sixth embodiment.

FIG. 8 is a block diagram illustrating an internal configuration of an inter-branch correction device 1100a of a phased array antenna according to the sixth embodiment. Since components that are operated in a similar manner to the fifth embodiment are given the same reference signs, description thereof will not be repeatedly made, and different contents will be described.

The inter-branch correction device 1100a of the phased array antenna includes a first branch Aa, a second branch Ba and a third branch Ca that form a plurality of (N) branches, a mixer 1009a, an LPF 1010a, a mixer 1015a, an LPF 1016a, a switch 1021, an ADC 1022, a delay controller 1023a and a local signal generator LoGena.

The first branch Aa includes a modulator 1005, an exchanging section 1024, a delay unit 1006a that serves as a delay section, a DAC 1007, a mixer 1008 that serves as a mixing section, and an antenna Ant1. Similarly the second branch Ba includes a modulator 1011, an exchanging section 1025, a delay unit 1012a that serves as a delay section, a DAC 1013, a mixer 1014 that serves as a mixing section, and an antenna Ant2. Further, the third branch Ca includes a modulator 1017, an exchanging section 1026, a delay unit 1018a that serves as a delay section, a DAC 1019, a mixer 1020 that serves as a mixing section, and an antenna Ant3.

The exchanging section 1024 or the exchanging section 1025 exchanges respective components of an I signal and a Q signal of a baseband transmission signal output from the modulator 1005 or the modulator 1011. In the present embodiment, in a period when a phase error between the first branch Aa and the second branch Ba is cancelled, the exchanging section 1024 exchanges the respective components of the I signal and the Q signal of the baseband transmission signal output from the modulator 1005. Further, the exchanging section 1025 does not exchange the respective components of the I signal and the Q signal of the baseband transmission signal output from the modulator 1011.

Here, in a case where the exchanging section 1025 exchanges the respective components of the I signal and the Q signal of the baseband transmission signal output from the modulator 1011, the exchanging section 1024 does not exchange the respective components of the I signal and the Q signal of the baseband transmission signal output from the modulator 1005.

The exchanging section 1024 receives an input of the baseband transmission signal output from the modulator 1005, and exchanges the respective components of the I signal and the Q signal of the received transmission signal. The exchanging section 1024 outputs the baseband transmission signal in which the respective components of the I signal and the Q signal are output to the delay unit 1006a.

The exchanging section 1025 receives an input of the baseband transmission signal output from the modulator 1011, and exchanges the respective components of the I signal and the Q signal of the received transmission signal. The exchanging section 1025 outputs the baseband transmission signal in which the respective components of the I signal and the Q signal are exchanged to the delay unit 1012a.

The exchanging section 1026 receives an input of the baseband transmission signal output from the modulator 1017, and exchanges the respective components of the I signal and the Q signal of the received transmission signal. The exchanging section 1026 outputs the baseband transmission signal in which the respective components of the I signal and the Q signal are exchanged to the delay unit 1018a.

A multiplication process in the mixer 1009a will be described using expressions. Two high frequency signals RF1 and RF2 are represented as Expression (5) and Expression (6). By exchanging the I component and the Q component of the baseband transmission signal of the exchanging section 1024 of the first branch A, the phase error between the two high frequency signals RF1 and RF2 becomes (90°+φ) where the parameter X=0.

Expression 5

$$RF1 = \cos(\omega \cdot t + X) \quad (5)$$

Expression 6

$$RF2 = \cos(\omega \cdot t + \phi + 90°) \quad (6)$$

In Expression (5), the parameter X is a variable of −180° to +180°, which represents a phase delay amount in the delay unit 1006a of the first branch Aa. The delay controller 1023a delays the phase of the baseband transmission signal in the delay unit 1006, among the delay unit 1006a of the first branch Aa and the delay unit 1012a of the second branch Ba. Here, the delay controller 1023a may delay the phase of the baseband transmission signal in the delay unit 1012a.

In Expression (6), the parameter φ represents a phase error that occurs between the two high frequency signals RF1 and RF2 due to up-conversion of the mixers 1008 and 1014 of the respective adjacent branches (the first branch Aa and the second branch Ba). The parameter φ is in the vicinity of 0° (for example, 0° to 10°), and for example, 5°.

The mixer 1009a performs a multiplication process for the two high frequency signals RF1 and RF2, and outputs a multiplication result Y to the LPF 1010a (see Expression (7)). In Expression (7), the parameter Y represents the multiplication result of the two high frequency signals RF1 and RF2. In Expression (7), the multiplication result Y of the mixer 1009a includes a signal that is a sum component of a high frequency component of two times an angular velocity ω and a DC component that does not depend on the angular velocity ω.

Expression 7

$$\begin{aligned} Y &= Mixout(RF1, RF2) \quad (7)\\ &= \cos(\omega \cdot t + X) \times \cos(\omega \cdot t + \phi + 90°)\\ &= \frac{1}{2}\{\cos(\omega \cdot t + X + \omega \cdot t + \phi + 90°) + \cos(\omega \cdot t + 90° + \phi - \omega \cdot t - X)\}\\ &= \frac{1}{2}\{\cos(2\omega \cdot t + 90° + \phi + X) + \cos(90° + \phi - X)\} \end{aligned}$$

The LPF 1010a removes a signal of a high frequency component that exceeds a predetermined cutoff frequency. The LPF 1010a removes a component in the first term of Expression (7) corresponding to the high frequency component from the multiplication result Y of the mixer 1009a (see Expression (7)), and outputs a signal Z of the DC component that does not depend on the angular velocity ω to the switch 1021 (see Expression (8)). That is, in the inter-branch correction device 1100a of the phase array antenna, the output signal Z of the LPF 1010a becomes a fixed DC component of a low frequency in which the high frequency component (for example, a millimeter wave) is removed.

Expression 8

$$Z = \frac{1}{2}\cos(90° + \phi - X) \quad (8)$$

The delay controller 1023a determines a phase delay amount of the baseband transmission signal in the delay unit 1006a of the first branch Aa or in the delay unit 1012a of the second branch Ba based on the output signal Z of the LPF 1010a that is converted by the ADC 1022. The inter-branch correction device 1100a of the phase array antenna delays the phase of the baseband transmission signal in the delay unit 1006a of the first branch Aa. Accordingly, the delay controller 1023a determines the phase delay amount of the baseband transmission signal in the delay unit 1006a of the first branch Aa based on the output signal Z of the LPF 1010a that is converted by the ADC 1022.

The delay controller 1023a outputs a delay control instruction that includes the determined phase delay amount to either delay unit 1006a or the delay unit 1012a among the adjacent first branch Aa and second branch Ba. That is, the delay controller 1023a causes the delay unit 1006a or the delay unit 1012a any one of the adjacent first branch Aa and second branch Ba to delay the phase of the baseband transmission signal modulated in the one branch by the determined phase delay amount.

In the present embodiment, the delay controller 1023a causes the delay unit 1006a of the first branch Aa among the adjacent first branch Aa and second branch Ba to delay the phase of the baseband transmission signal modulated in the modulator 1005 by the determined phase delay amount.

Figure 9:
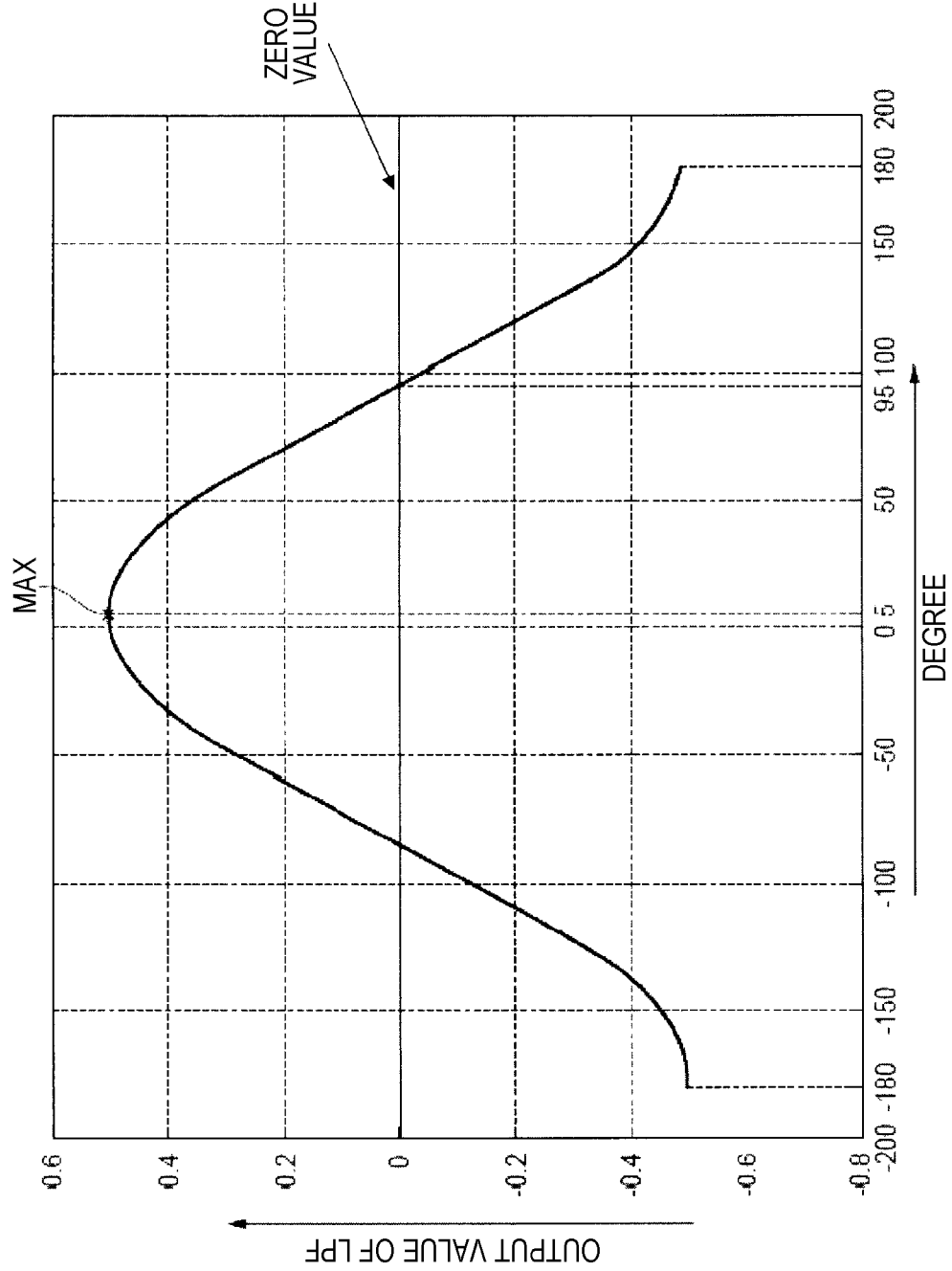
FIG. 9 is a graph illustrating a simulation result of the relationship between a phase delay amount in a delay unit of a first branch and an output signal of an LPF.

The determination of the phase delay amount in the delay controller 1023a will be described referring to FIG. 9. FIG. 9 is a graph illustrating a simulation result of the relationship between the phase delay amount in the delay unit 1006a of the first branch Aa and the output signal Z of the LPF 1010a.

In FIG. 9, the transverse axis represents a parameter (X+90°) since the phase of the baseband shifts by 90° by exchange of the I signal and the Q signal in the exchanging section 1024 of the first branch Aa. In FIG. 9, the longitudinal axis represents the output signal Z of the LPF 1010a.

In FIG. 9, a phase error of 5° occurs between the high frequency signal RF1 from the first branch Aa and the high frequency signal RF2 from the second branch Ba (φ=5). In FIG. 9, in a case where the phase component in Expression (8)

becomes 90° as the parameter X varies, that is, at X (=φ)=5°, the output signal Z of the LPF 1010a becomes a zero value.

In FIG. 9, the delay controller 1023a determines the parameter X (5° in FIG. 9) in a case where the output signal Z of the LPF 1010 becomes the zero value as the phase delay amount of the baseband transmission signal in the delay unit 1006a of the first branch Aa. The delay controller 1023a causes the delay unit 1006a of the first branch Aa among the adjacent first branch Aa and second branch Ba to delay the phase of the base band transmission signal modulated in the modulator 1005 by the determined phase delay amount (5°). The delay controller 1023a causes the delay unit 1012a of the second branch Ba not to delay the phase of the baseband transmission signal modulated in the modulator 1011.

Further, the delay controller 1023a may cause the delay unit 1012a of the second branch Ba among the adjacent first branch Aa and second branch Ba to delay the phase of the baseband transmission signal modulated in the modulator 1011 by the phase delay amount (−5°) corresponding to a reverse phase of the determined phase delay amount. The delay controller 1023a causes the delay unit 1006a of the first branch Aa not to delay the phase of the baseband transmission signal modulated in the modulator 1005.

As described above, the inter-branch correction device 1100a of the phased array antenna exchanges the respective components of the I signal and the Q signal of the baseband transmission signal in any one branch in a case where the phase error φ between two high frequency signals RF1 and RF2 output from the adjacent first branch Aa and second branch Ba is in the vicinity of 0°. Due to the exchange of the respective components, the phase error between two high frequency signals RF1 and RF2 becomes (90°+φ).

Further, the inter-branch correction device 1100a of the phased array antenna determines the phase delay amount in the delay unit 1006a or the delay unit 1012a based on the output signal of the LPF 1010a that is converted by the ADC 1022. Further, the inter-branch correction device 1100a of the phased array antenna causes the delay unit 1006a or the delay unit 1012a to delay the phase of the baseband transmission signal modulated in each branch corresponding to the delay unit 1006a or the delay unit 1012a by the determined phase delay amount.

According to the inter-branch correction device 1100a of the phased array antenna with this configuration, due to the exchange of the I signal and the Q signal, it is possible to determine the phase error between the high frequency signals RF1 and RF2 in the vicinity of 90° where the detection accuracy of the ADC 1022 is high, with high accuracy, in addition to the effect of the fifth embodiment. In the inter-branch correction device 1100a of the phased array antenna, it is possible to use the ADC 1022a having a resolution corresponding to 7 bits, for example, compared with the fifth embodiment in which the ADC 1022 having a resolution corresponding to 14 bits is necessary, for example.

Accordingly, in the inter-branch correction device 1100a of the phased array antenna, it is possible to easily determine the phase delay amount in the delay unit 1006a or the delay unit 1012a based on the zero value of the output signal of the LPF 1010a that is converted by the ADC 1022a.

Seventh Embodiment

In a seventh embodiment, in a case where the phase error that occurs between two high frequency signals output from the respective adjacent branches is not present and the respective phases of the two high frequency signals coincide with each other, a predetermined phase difference is formed between respective local signals supplied to the respective branches based on a phase adjustment table.

For example, a case will be described where when a phase error that occurs between two high frequency signals RF1 and RF2 that are respectively output from a first branch Ab and a second branch Bb is not present and the phases of the respective high frequency signals RF1 and RF2 coincide with each other, a phase difference of 10° is formed between respective local signals Lo1 and Lo2 supplied to the mixers 1008 and 1014.

Figure 10:
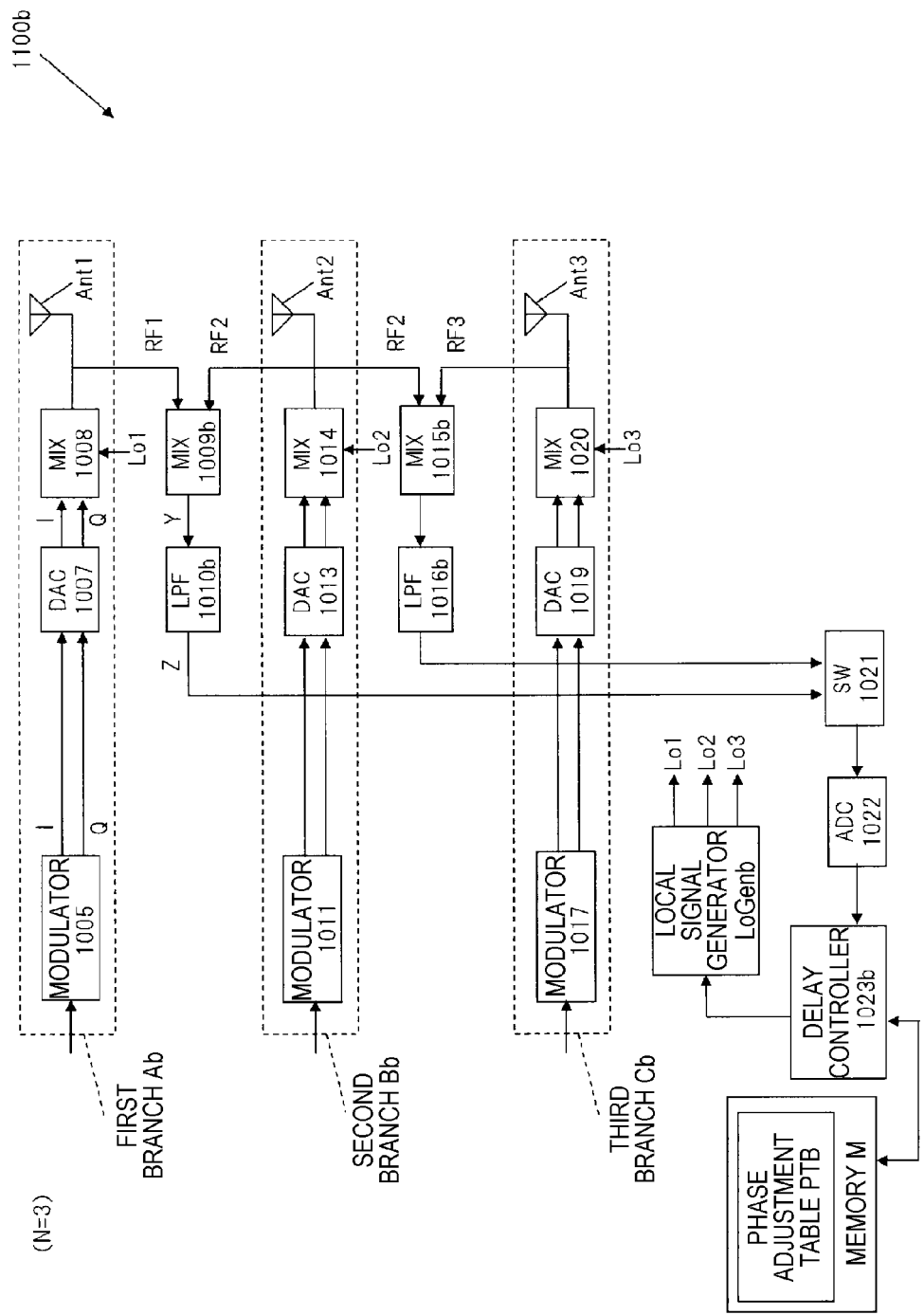
FIG. 10 is a block diagram illustrating an internal configuration of an inter-branch correction device of a phased array antenna according to a seventh embodiment.

FIG. 10 is a block diagram illustrating an internal configuration of an inter-branch correction device 1100b of a phased array antenna according to the seventh embodiment. Components that are operated in a similar manner to the fifth embodiment are given the same reference signs, and thus, description thereof will not be repeatedly made, and different contents will be described.

The inter-branch correction device 1100b of the phased array antenna includes a first branch Ab, a second branch Bb and a third branch Cb that form a plurality of (N) branches, a mixer 1009b, an LPF 1010b, a mixer 1015b, an LPF 1016b, a switch 1021, an ADC 1022, a delay controller 1023b, a memory M that serves as a memory section, and a local signal generator LoGenb.

The first branch Ab includes a modulator 1005, a DAC 1007, a mixer 1008 that serves as a mixing section, and an antenna Ant1. Similarly, the second branch Bb includes a modulator 1011, a DAC 1013, a mixer 1014 that serves as a mixing section, and an antenna Ant2. Further, the third branch Cb includes a modulator 1017, a DAC 1019, a mixer 1020 that serves as a mixing section, and an antenna Ant3.

Figure 11:
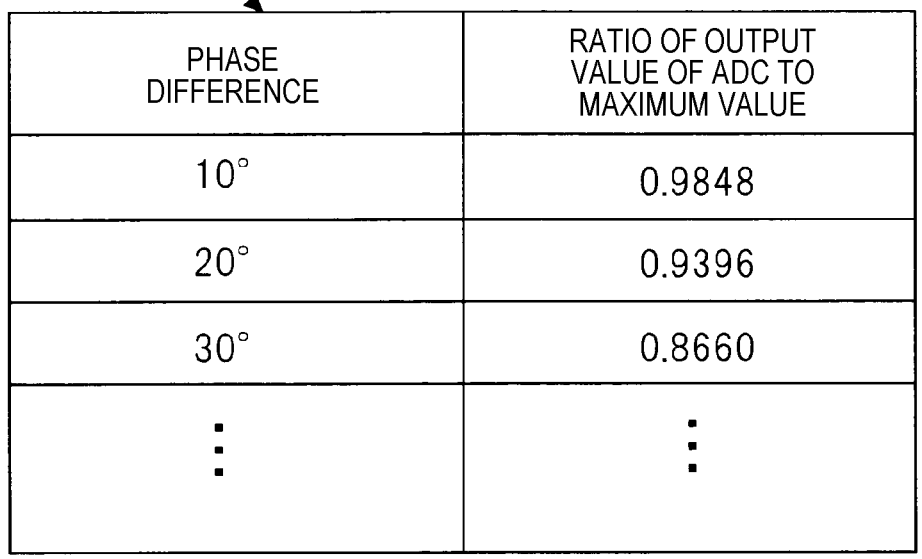
FIG. 11 is a diagram illustrating an example of a phase adjustment table.

The memory M is configured by a flash memory or a hard disk that is built in the inter-branch correction device 1100b of the phased array antenna, and stores a phase adjustment table PTB. The phase adjustment table PTB will be described referring to FIG. 11. FIG. 11 is a diagram illustrating an example of the phase adjustment table PTB.

In the phase adjustment table PTB, a phase difference formed between respective local signals (for example, Lo1 and Lo2) supplied to the respective branches is matched with the ratio of an output value of the ADC 1022 to the maximum value. When the phase difference formed between the respective local signals is 10°, the ratio of the output value of the ADC 1022 to the maximum value is 0.9848. Similarly, when the phase difference formed between the respective local signals is 20°, the ratio of the output value of the ADC 1022 to the maximum value is 0.9396. Similarly, when the phase difference formed between the respective local signals is 30°, the ratio of the output value of the ADC 1022 to the maximum value is 0.8660.

The delay controller 1023b causes the local signal generator LoGenb to form the phase difference (for example, 10°) between the respective local signals Lo1 and Lo2 based on the output signal Z of the LPF 1010b converted by the ADC 1022 and the phase adjustment table PTB. That is, the delay controller 1023b adjusts the phase of the local signal generator LoGenb so that the output signal Z of the LPF 1010b converted by the ADC 1022 becomes the value (0.9848) based on the phase difference (10°) between the respective local signals Lo1 and Lo2, to form the phase difference of 10° between the local signals Lo1 and Lo2.

The local signal generator LoGenb generates the respective local signals Lo1 and Lo2 that form the phase difference of 10° between the local signals Lo1 and Lo2 according to an instruction from the delay controller 1023b. The local signal generator LoGenb supplies the generated respective local signals Lo1 and Lo2 to the mixer 1008 of the first branch Ab and the mixer 1014 of the second branch Bb, respectively. Thus, the phase difference of 10° between the two high frequency signals from the first branch Ab and the second branch Bb is formed.

The local signal generator LoGenb includes an oscillator and a phase shifter, and controls a phase shift delay amount of the phase shifter in order to form a phase difference, for example.

As described above, the inter-branch correction device 1100b of the phased array antenna forms a predetermined phase difference between the respective local signals supplied to the respective branches based on the phase adjustment table PTB, in a case where the respective phases of the two high frequency signals output from the respective adjacent branches coincide with each other. The delay controller 1023b adjusts the phase delay amount of the phase shifter of the local signal generator LoGenb so that the output signal Z of the LPF 1010b that is converted by the ADC 1022 becomes the value (0.9848) based on the phase difference (for example, 10°) between the respective local signals Lo1 and Lo2, to form the phase difference of 10° between the local signals Lo1 and Lo2.

Thus, according to the inter-branch correction device 1100b of the phased array antenna, in a case where the respective phases of two high frequency signals output from the respective adjacent branches coincide with each other, it is possible to form a desired phase difference between the respective adjacent branches by adjusting the phase difference between the local signals. Thus, according to the inter-branch correction device 1100b of the phased array antenna, it is possible to individually form a desired phase difference between two high frequency signals output from the respective adjacent branches, and to easily realize a phased array technique. For example, according to the inter-branch correction device 1100b of the phased array antenna, it is possible to form a phase difference of 10° between the first branch Ab and the second branch Bb, and to form a phase difference of −10° between the second branch Bb and the third branch Cb.

In the above-described seventh embodiment, according to the inter-branch correction device 1100b of the phased array antenna, it is possible to form a desired phase difference between respective adjacent branches even in a case where a phase error that occurs between two high frequency signals from the respective adjacent branches is present and the respective phases of two high frequency signals do not coincide with each other. For example, according to the inter-branch correction device 1100b of the phased array antenna, by adjusting the output signal Z of the LPF 1010b that is converted by the ADC 1022 to a value based on a desired phase difference of the phase adjustment table PTB, it is similarly possible to form the desired phase difference.

Eighth Embodiment

In an eighth embodiment, in a case where a phase error occurs between two high frequency signals that are output from respective adjacent branches, in a similar manner to the description in the fifth embodiment, a desired phase difference is formed between the respective adjacent branches after the phase error is cancelled.

For example, in a case where a phase error occurs between two high frequency signals RF1 and RF2 output from a first branch Ac and a second branch Bc, the phase of a baseband transmission signal is delayed in a delay unit 1006 of the first branch Ac to cancel the phase error. Further, a case where a desired phase difference (10°) between the first branch Ac and the second branch Bc is formed after the phase error is canceled will be described.

Figure 12:
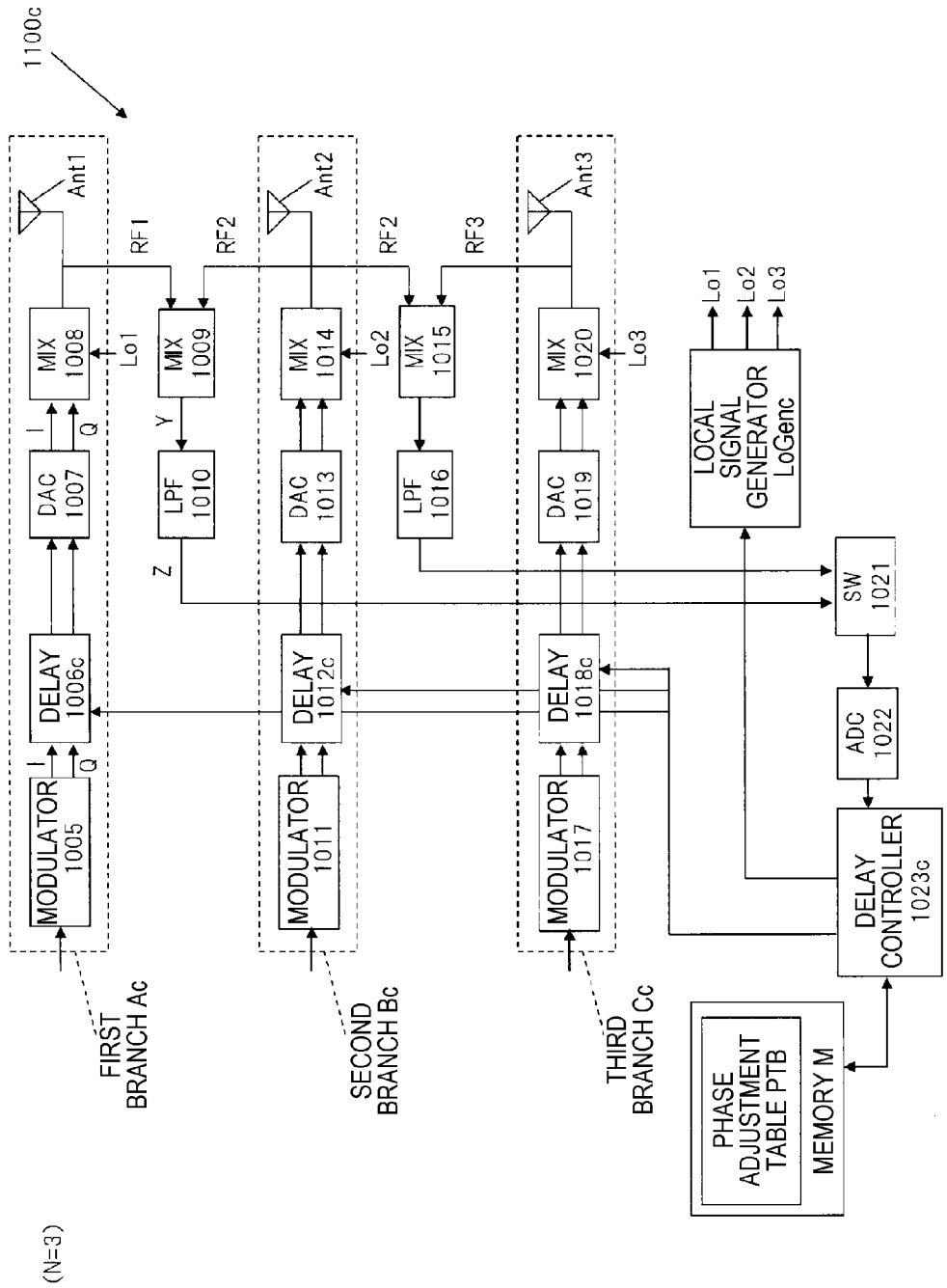
FIG. 12 is a block diagram illustrating an internal configuration of an inter-branch correction device of a phased array antenna according to an eighth embodiment.

FIG. 12 is a block diagram illustrating an internal configuration of an inter-branch correction device 1100c of a phased array antenna according to the eighth embodiment. Components that are operated in a similar manner to the seventh embodiment are given the same reference signs, and thus, description thereof will not be repeatedly made, and different contents will be described.

The inter-branch correction device 1100c of the phased array antenna includes a first branch Ac, a second branch Bc and a third branch Cc that form a plurality of (N) branches, a mixer 1009c, an LPF 1010c, a mixer 1015c, an LPF 1016c, a switch 1021, an ADC 1022, a delay controller 1023c, a memory M that serves as a memory section, and a local signal generator LoGenc.

The first branch Ac includes a modulator 1005, a delay unit 1006c that serves as a delay section, a DAC 1007, a mixer 1008 that serves as a mixing section, and an antenna Ant1. Similarly, the second branch Bc includes a modulator 1011, a delay unit 1012c that serves as a delay section, a DAC 1013, a mixer 1014 that serves as a mixing section, and an antenna Ant2. Further, the third branch Cc includes a modulator 1017, a delay unit 1018 that serves as a delay section, a DAC 1019, a mixer 1020 that serves as a mixing section, and an antenna Ant3.

The delay controller 1023c determines a phase delay amount of a baseband transmission signal in the delay unit 1006c of the first branch Ac based on the output signal Z of the LPF 1010c that is converted by the ADC 1022. The delay controller 1023c outputs a delay control instruction that includes the determined phase delay amount to the delay unit 1006c of the first branch Ac. That is, the delay controller 1023c causes the delay unit 1006c of the first branch Ac to delay the phase of the baseband transmission signal modulated in the modulator 1005 by the determined phase delay amount. Thus, in a similar manner to the description in the fifth embodiment, according to the inter-branch correction device 1100c of the phased array antenna, it is possible to cancel the phase error between two high frequency signals from the first branch Ac and the second branch Bc.

Further, after canceling the phase error, the delay controller 1023c forms a desired phase difference (10°) between the first branch Ac and the second branch Bc. Specifically, the delay controller 1023c causes the local signal generator LoGenc to form a phase difference (for example, 10°) between the respective local signals Lo1 and Lo2 based on the output signal Z of the LPF 1010c that is converted by the ADC 1022 and the phase adjustment table PTB.

That is, the delay controller 1023c adjusts a phase delay amount of a phase shifter of the local signal generator LoGenc so that the output signal Z of the LPF 1010c converted by the ADC 1022 becomes a value (0.9848) based on the phase difference (10°) between the respective local signals Lo1 and Lo2, to form the phase difference of 10° between the local signals Lo1 and Lo2.

The local signal generator LoGenc generates the respective local signals Lo1 and Lo2 that form the phase difference of 10° between the local signals Lo1 and Lo2 according to the instruction from the delay controller 1023c. The local signal generator LoGenc supplies the generated respective local signals Lo1 and Lo2 to the mixer 1008 of the first branch Ac and the mixer 1014 of the second branch Bc, respectively. Thus, the phase difference of 10° between the two high frequency signals is formed from the first branch Ac and the second branch Bc.

The local signal generator LoGenc includes an oscillator and the phase shifter, and for example, controls a phase shift delay amount of the phase shifter in order to form the phase difference.

As described above, in a similar manner to the description in the fifth embodiment, according to the inter-branch correction device 1100c of the phased array antenna, the phase error that occurs between two high frequency signals from the respective adjacent branches is cancelled, and then, a predetermined phase difference is formed between the respective local signals supplied to the respective branches based on the phase adjustment table PTB. The delay controller 1023c adjusts the phase of the local signal generator LoGenb so that the output signal Z of the LPF 1010c that is converted by the ADC 1022 becomes the value (0.9848) based on the phase difference (for example, 10°) between the respective local signals Lo1 and Lo2, to form the phase difference of 10° between the local signals Lo1 and Lo2.

According to the inter-branch correction device 1100c of the phased array antenna with this configuration, it is possible to form a desired phase difference between the respective adjacent branches by canceling the phase error that occurs between two high frequency signals output from the respective adjacent branches and by adjusting the phase difference between the local signals. Thus, according to the inter-branch correction device 1100c of the phased array antenna, it is possible to individually form a desired phase difference between two high frequency signals output from the respective adjacent branches, and to easily realize a phased array technique. For example, according to the inter-branch correction device 1100b of the phased array antenna, it is possible to form a phase difference of 10° between the first branch Ab and the second branch Bb, and to form a phase difference of −10° between the second branch Bb and the third branch Cb.

Ninth Embodiment

In a ninth embodiment, in a case where the exchanging section in the sixth embodiment is provided, a phase error that occurs between two high frequency signals output from respective adjacent branches is not present and the phases of the two high frequency signals coincide with each other, a predetermined phase difference is formed between respective local signals supplied to the respective branches based on a phase adjustment table.

For example, in a case where a phase error that occurs between two high frequency signals RF1 and RF2 output from a first branch Ad and a second branch Bd is not present and the phases of the respective high frequency signals RF1 and RF2 coincide with each other, a case where a phase difference of 10° is formed between respective local signals Lo1 and Lo2 supplied to mixers 1008 and 1014 will be described.

Figure 13:
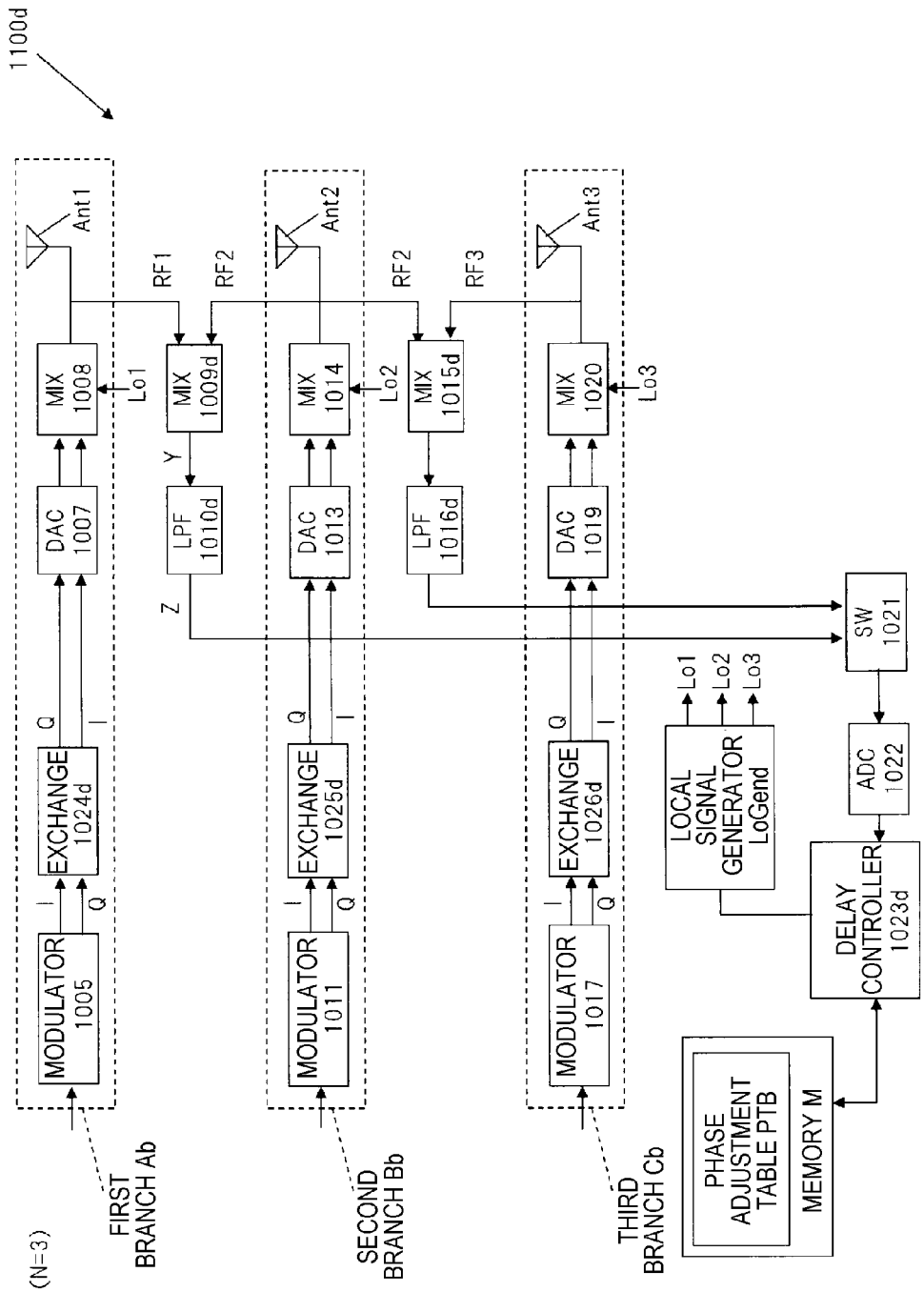
FIG. 13 is a block diagram illustrating an internal configuration of an inter-branch correction device of a phased array antenna according to a ninth embodiment.

FIG. 13 is a block diagram illustrating an internal configuration of an inter-branch correction device 1100d of a phased array antenna according to the ninth embodiment. Components that are operated in a similar manner to the sixth and seventh embodiments are given the same reference signs, and thus, description thereof will not be repeatedly made.

The inter-branch correction device 1100d of the phased array antenna includes a first branch Ad, a second branch Bd and a third branch Cd that form a plurality of (N) branches, a mixer 1009d, an LPF 1010d, a mixer 1015d, an LPF 1016d, a switch 1021, an ADC 1022, a delay controller 1023d, a memory M that serves as a memory section, and a local signal generator LoGend.

The first branch Ad includes a modulator 1005, an exchanging section 1024d, a DAC 1007, a mixer 1008 that serves as a mixing section, and an antenna Ant1. Similarly, the second branch Bd includes a modulator 1011, an exchanging section 1025d, a DAC 1013, a mixer 1014 that serves as a mixing section, and an antenna Ant2. Further, the third branch Cd includes a modulator 1017, an exchanging section 1026d, a DAC 1019, a mixer 1020 that serves as a mixing section, and an antenna Ant3.

The ninth embodiment is the same as the sixth embodiment in that a phase error that occurs between two high frequency signals from respective adjacent branches is cancelled. Further, the present embodiment is the same as the seventh embodiment in that a predetermined phase difference is formed between respective local signals supplied to the respective branches based on a phase adjustment table after the phase error is cancelled.

As described above, in the inter-branch correction device 1100d of the phased array antenna, respective components of an I signal and a Q signal of a baseband transmission signal of the first branch Ad are exchanged in the exchanging section 1024d. The inter-branch correction device 1100d of the phased array antenna sets a phase error that occurs between two high frequency signals RF1 and RF2 from the adjacent first branch AD and second branch Bd to be equal to or greater than 90°, to easily determine each phase delay amount of the two high frequency signals.

Further, in a case where the phases of two high frequency signals from the adjacent first branch Ad and second branch Bd coincide with each other, the inter-branch correction device 1100d of the phased array antenna forms a predetermined phase difference between respective local signals supplied to the respective branches based on the phase adjustment table.

According to the inter-branch correction device 1100d of the phased array antenna with this configuration, it is possible to easily determine each phase error of two high frequency signals from respective adjacent branches, and to cancel each phase error with high accuracy. Further, according to the inter-branch correction device 1100d of the phased array antenna, by adjusting the phase difference between the local signals, it is possible to form a desired phase difference between the respective adjacent branches.

Thus, according to the inter-branch correction device 1100d of the phased array antenna, it is possible to individually form a desired phase difference between two high frequency signals from the respective adjacent branches, and to easily realize a phased array technique. For example, according to the inter-branch correction device 1100d of the phased array antenna, it is possible to form a phase difference of 10° between the first branch Ad and the second branch Bd, and to form a phase difference of −10° between the second branch Bd and the third branch Cd.

Tenth Embodiment

In a tenth embodiment, in a case where a phase error occurs between two high frequency signals output from respective adjacent branches, since the phase error between the two high frequency signals becomes 90° by the exchanging section of the sixth embodiment, the phase error is cancelled using a delay in a delay unit. Further, in the present embodiment, a predetermined phase difference is formed between the respective adjacent branches.

For example, in a case where a phase error occurs between two high frequency signals RF1 and RF2 output from a first branch Ae and a second branch Be, since the phase error between the two high frequency signals RF1 and RF2 becomes 90° by an exchanging section 1024e, the phase of a baseband transmission signal is delayed in a delay unit 1006 of the first branch Ac to cancel the phase error. Further, a case where a desired phase difference (10° between the first branch Ae and the second branch Be is formed after the phase error is cancelled will be described.

Figure 14:
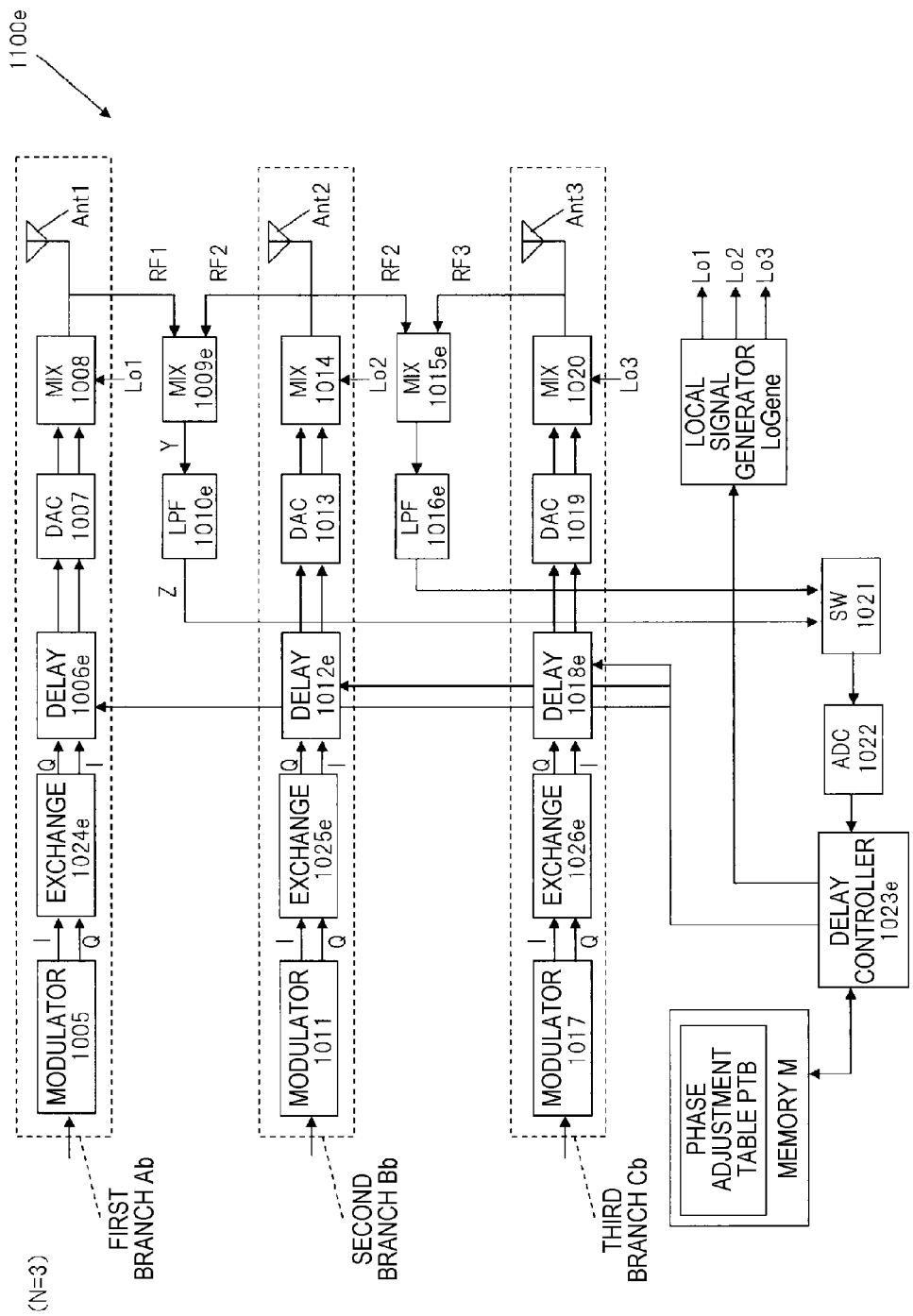
FIG. 14 is a block diagram illustrating an internal configuration of an inter-branch correction device of a phased array antenna according to a tenth embodiment.

FIG. 14 is a block diagram illustrating an internal configuration of an inter-branch correction device 1100e of a phased array antenna according to the tenth embodiment. Components that are operated in a similar manner to the sixth and eight embodiments are given the same reference signs, and thus, description thereof will not be repeatedly made.

The inter-branch correction device 1100e of the phased array antenna includes a first branch Ae, a second branch Be and a third branch Ce that form a plurality of (N) branches, a mixer 1009e, an LPF 1010e, a mixer 1015e, an LPF 1016e, a switch 1021, an ADC 1022, a delay controller 1023e, a memory M that serves as a memory section, and a local signal generator LoGene.

The first branch Ae includes a modulator 1005, an exchanging section 1024e, a DAC 1007, a delay unit 1006e that serves as a delay section, a mixer 1008 that serves as a mixing section, and an antenna Ant1. Similarly, the second branch Be includes a modulator 1011, an exchanging section 1025e, a delay unit 1012e that serves as a delay section, a DAC 1013, a mixer 1014 that serves as a mixing section, and an antenna Ant2. Further, the third branch Ce includes a modulator 1017, an exchanging section 1026e, a delay unit 1018e that serves as a delay section, a DAC 1019, a mixer 1020 that serves as a mixing section, and an antenna Ant3.

The tenth embodiment is the same as the sixth embodiment in that a phase error that occurs between two high frequency signals from respective adjacent branches is cancelled. Further, the present embodiment is the same as the eighth embodiment in that a predetermined phase difference is formed between respective local signals supplied to the respective branches based on a phase adjustment table after the phase error is cancelled.

As described above, in a case where a phase difference formed between respective local signals supplied to respective adjacent branches is in the vicinity of 0°, the inter-branch correction device 1100e of the phased array antenna exchanges respective components of an I signal and a Q signal of a baseband transmission signal of the first branch Ae in the exchanging section 1024e. Further, in a case where the phase difference formed between the respective local signals supplied to the respective adjacent branches is in the vicinity of 90°, the inter-branch correction device 1100e of the phased array antenna does not exchange the respective components of the I signal and the Q signal of the baseband transmission signal of the first branch Ae in the exchanging section 1024e. It is preferable that information relating to the phase difference formed between the respective local signals supplied to the respective adjacent branches be input to the modulator of each branch.

In a case where the phase difference formed between the respective local signals supplied to the respective adjacent branches is in the vicinity of 0=, the inter-branch correction device 1100e of the phased array antenna sets a phase error that occurs between two high frequency signals RF1 and RF2 from the adjacent first branch Ae and second branch Be to be equal to or greater than 90° to easily determine each phase delay amount of the two high frequency signals (see FIG. 9).

In a case where the phase difference formed between the respective local signals supplied to the respective adjacent branches is in the vicinity of 90°, the inter-branch correction device 1100e of the phased array antenna determines the phase error that occurs between the two high frequency signals RF1 and RF2 from the adjacent first branch Ae and second branch Be with high accuracy (see FIG. 7).

Further, in a case where the phases of the two high frequency signals from the adjacent first branch Ae and second branch Be coincide with each other, the inter-branch correction device 1100e of the phased array antenna forms a predetermined phase difference between respective local signals supplied to the respective branches based on a phase adjustment table.

According to the inter-branch correction device 1100e of the phased array antenna with this configuration, it is possible to easily determine each phase error of two high frequency signals from the respective adjacent branches, and to cancel each phase error with high accuracy. Further, according to the inter-branch correction device 1100e of the phased array antenna, by adjusting the phase difference between the local signals, it is possible to form a desired phase difference between the respective adjacent branches.

Thus, according to the inter-branch correction device 1100e of the phased array antenna, it is possible to individually form a desired phase difference between two high frequency signals from the respective adjacent branches according to the phase difference formed between the respective local signals supplied to the respective adjacent branches, and to easily realize a phased array technique. For example, according to the inter-branch correction device 1100e of the phased array antenna, it is possible to form a phase difference of 10° between the first branch Ae and the second branch Be, and to form a phase difference of −10° between the second branch Be and the third branch Ce.

Hereinbefore, the various embodiments are described referring to the accompanying drawings, but the present disclosure is not limited thereto. It will be obvious to those skilled in the art that various modifications and changes may be made in the scope of claims, which are included in the technical scope of the present disclosure.

Figure 15:
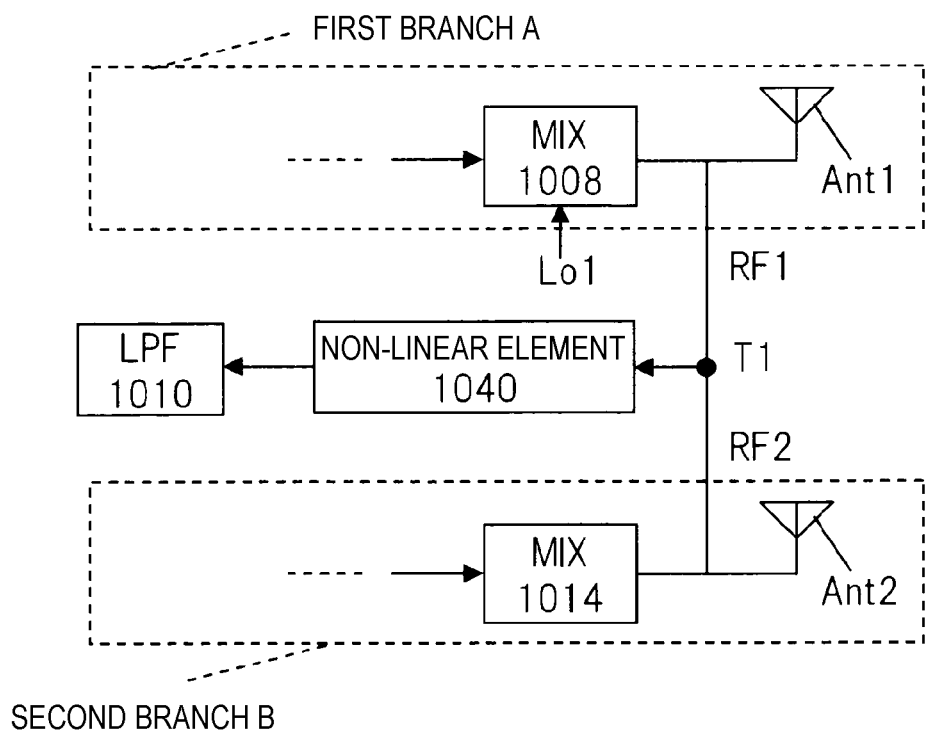
FIG. 15 is a block diagram illustrating a configuration example in which a non-linear element instead of a mixer is used as a circuit element to which each high frequency signal from respective branches is input.

In the respective embodiments described above, the frequency converter is formed using the mixers 1009 to 1009e and 1015 to 1015e, but as shown in FIG. 15, the frequency converter may be formed using a non-linear element 1040 (for example, a diode). FIG. 15 is a block diagram illustrating an example in which a circuit element that receives respective inputs of a high frequency signal RF1 from a first branch A and a high frequency signal RF2 from a second branch B is formed using the non-linear element 1040 instead of the mixer 1009.

In FIG. 15, the high frequency signal RF1 of the first branch A and the high frequency signal RF2 of the second branch B are coupled (added) to each other at a terminal T1 and are input to the non-linear element 1040. The terminal T1 is a coupling point at which a signal line of the high frequency signal RF1 from the first branch A and a signal line of the high frequency signal RF2 from the second branch B are short-circuited. Further, in FIG. 15, the high frequency signal RF1 of the first branch A and the high frequency signal RF2 of the second branch B may be input to the non-linear element 1040 through a directional coupler instead of being input to the non-linear element 1040 by being coupled to each other at the terminal T1 due to the short circuit of the signal lines.

The non-linear element 1040 has input and output characteristics shown by Expression (9), and for example, outputs a square component (quadratic term component) in a sum signal of two high frequency signals RF1 and RF2 to the LPF 1010.

Expression 9

$$W = A_n V^n + \ldots + A_3 V^3 + A_2 V^2 + A_1 V + A_0 \quad (9)$$

Expression 10

$$A_n < \ldots < A_3 < A_2 < A_1 < A_0 \quad (10)$$

In Expression (9), a parameter V represents an input signal, a parameter W represents an output signal. Further, coefficients $A_n, \ldots, A_3, A_2, A_1$ and $A_0$ establishes the relationship of Expression (10), and are close to zero as the order of a coefficient is high.

It is assumed that two high frequency signals RF1 and RF2 expressed by Expression (1) and Expression (2) are respectively input to the non-linear element 1040. The non-linear element 1040 outputs the quadratic term component W(V) of two high frequency signals RF1 and RF2 to the LPF 1010 (see Expression (11)). In Expression (11), it is assumed that the coefficient $A_2$ of the quadratic term component of Expression (9) is not considered.

Expression 10

$$\begin{aligned} W &= (RF1 + RF2)^2 \quad (11) \\ &= \{\cos(\omega \cdot t + X) + \cos(\omega \cdot t + \phi)\}^2 \\ &= \cos^2(\omega \cdot t + X) + 2\cos(\omega \cdot t + X)\cos(\omega \cdot t + \phi) + \cos^2(\omega \cdot t + \phi) \\ &= \frac{1}{2}\{1 + \cos2(\omega \cdot t + X)\} + \frac{1}{2}\{1 + \cos2(\omega \cdot t + \phi)\} + 2 \cdot \\ &\quad \{\cos2(\omega \cdot t + X + \phi) + \cos(X - \phi)\} \\ &= \frac{1}{2}\{\cos2(\omega \cdot t + X) + \cos2(\omega \cdot t + \phi) + \cos2(\omega \cdot t + X + \phi)\} + \\ &\quad \{1 + \cos(\phi - X)\} \end{aligned}$$

The LPF 1010 removes a signal of a high frequency component that exceeds a predetermined cutoff frequency. The LPF 1010 removes a component in the first term of Expression (11) from the output result W (see Expression (11)) from the non-linear element 1040, and outputs a signal Z of the DC component that does not depend on the angular velocity w to the switch 1021 (see Expression (12)). That is, in the inter-branch correction device 1100 of the phased array antenna, the output signal Z of the LPF 1010 becomes a fixed DC component of a low frequency in which the high frequency component (for example, a millimeter wave) is removed. The subsequent operations of the LPF 1010 are the same as in the above-described embodiments, and thus, description thereof will not be repeatedly made.

Expression 12

$$Z = 1 + \cos(\phi - X) \quad (12)$$

The present disclosure is useful for a transmission device or a radar device that is capable of correcting the phase error between the high frequency signals in the respective branches provided corresponding to the respective antenna that form the phased array antenna with high accuracy, without increase in circuit size.

According to a first solution of the present disclosure, there is provided an inter-branch correction device of a phased array antenna, including: a plurality of branches that includes at least a modulator, configured to modulate a baseband transmission signal, a delay section, configured to delay the phase of the modulated transmission signal, a mixing section, configured to convert the delayed transmission signal into a high frequency signal, and an antenna, configured to transmit the high frequency signal; a frequency converter, configured to perform frequency conversion based on two high frequency signals output from the respective adjacent branches; a filtering section, configured to extract a DC component based on an output signal from the frequency converter; and a delay controller, configured to determine a predetermined phase delay amount in the delay section of the branch based on the DC component extracted by the filtering section, in which the delay controller causes the delay section of any one of the respective adjacent branches to delay the phase of the transmission signal modulated in the one branch by the predetermined phase delay amount that is determined.

According to a second solution of the present disclosure, in the inter-branch correction device of a phased array antenna according to the first solution, each branch may further include an exchanging section, configured to exchange respective components of an in-phase signal of the transmission signal modulated by the modulator and a quadrature signal of the transmission signal modulated by the modulator.

According to a third solution of the present disclosure, the inter-branch correction device of a phased array antenna according to the first or second solution may further include: a local signal generator, configured to generate a local signal to be supplied to the mixer of each branch; and a memory section that stores a phase adjustment table in which a phase difference between the respective supplied local signals and a ratio of the DC component extracted by the filtering section to a maximum value are matched with each other, in which the delay controller may cause the local signal generator to form a predetermined phase difference between the local signals supplied to the mixers of the respective adjacent branches based on the phase adjustment table.

According to a fourth solution of the present disclosure, in the inter-branch correction device of a phased array antenna according to the first solution, the delay controller may determine the predetermined phase delay amount in the delay section of the branch based on the maximum value of the DC component extracted by the filtering section.

According to a fifth solution of the present disclosure, in the inter-branch correction device of a phased array antenna according to the second solution, the delay controller may determine the predetermined phase delay amount in the delay section of the branch based on a zero value of the DC component extracted by the filtering section.

According to a sixth solution of the present disclosure, in the inter-branch correction device of a phased array antenna according to any one of the first to fifth solutions, the frequency converter may be configured using a non-linear element section that outputs a signal of a predetermined term component based on a sum signal of two high frequency signals from the respective adjacent branches.

According to a seventh solution of the present disclosure, there is provided an inter-branch correction method in an inter-branch correction device of a phased array antenna including a plurality of branches that includes at least a modulator, configured to modulate a baseband transmission signal, a delay section, configured to delay the phase of the modulated transmission signal, a mixing section, configured to convert the delayed transmission signal into a high frequency signal, and an antenna, configured to transmit the high frequency signal, the method including: performing frequency conversion based on two high frequency signals output from the respective adjacent branches; extracting a DC component based on an output signal output from the frequency conversion; determining a predetermined phase delay amount in the delay section of the branch based on the extracted DC component; and causing the delay section of any one of the respective adjacent branches to delay the phase of the transmission signal modulated in the one branch by the predetermined phase delay amount that is determined.

According to the present invention, those skilled in the art may make various modifications and applications based on the description and known technologies in a range without departing from the spirit and scope of the present invention, which are included in the scope of claims. Further, the respective components in the above-described embodiments may be arbitrarily combined in a range without departing from the spirit of the present invention.

The present application is based on Japanese Patent Application No. 2011-169547 filed on Aug. 2, 2011 and Japanese Patent Application No. 2012-067989 filed on Mar. 23, 2012, the contents of which are incorporated herein by reference.

INDUSTRIAL APPLICABILITY

The present disclosure has the effect that it is possible to correct phase and amplitude errors between transmission branches with a simple configuration. The phased array transmission device according to the present disclosure may realize formation of a beam of high accuracy in which side lobes are suppressed with a small size at low cost and low power consumption compared with the related art, and is useful for a transmission device (for example, a base station) in a wireless communication system in which beam formation is necessary, a radar device in which detection accuracy is enhanced due to beam formation, a wireless chip for realizing the transmission device or the radar device, or the like.

REFERENCE SIGNS LIST 11, 12, 13, 14: antenna section
101, 102, 103, 104: transmission branch
110, 210: signal combining section
121, 122: branch detector
130, 230, 431, 432: combination detector
140, 240, 440: phase controller
150, 250: amplitude controller
161, 162, 163, 164: coupler section
171, 172, 173, 174: transmitter
181, 182, 183, 184: phase adjuster
191, 192, 193, 194: amplitude adjuster
331, 332, 333: inter-branch error detector
350: phase amplitude controller
410: combining and dividing section
1005, 1011, 1017: modulator
1006, 1006a, 1006c, 1006e, 1012, 1012a, 1012c, 1012e, 1018, 1018a, 1018c, 1018e: delay unit
1007, 1013, 1019: DAC
1008, 1009, 1014, 1015, 1020: mixer
1010, 1010a, 1010b, 1010c, 1010d, 1010e, 1016, 1016a, 1016b, 1016c, 1016d, 1016e: LPF
1021: switch (SW)
1022: ADC
1023, 1023a, 1023b, 1023c, 1023d, 1023e: delay controller 1024, 1024d, 1024e, 1025, 1025d, 1025e, 1026, 1026d, 1026e: exchanging section
1040: non-linear element
1000, 1000a, 1000b, 1000c, 1000d, 1000e: inter-branch correction device of phased array antenna
A, Aa, Ab, Ac, Ad, Ae: first branch
Ant1, Ant2, Ant3: antenna
B, Ba, Bb, Bc, Bd, Be: second branch
C, Ca, Cb, Cc, Cd, Ce: third branch
LoGen, LoGena, LoGenb, LoGenc, LoGend, LoGene: local signal generator
M: memory
PTB: phase adjustment table

The invention claimed is:

1. A phased array transmission device comprising:
a first transmission branch and a second transmission branch, each including:
  a transmitter, configured to transmit a transmission signal in a wireless frequency;
  a phase adjuster, configured to adjust a phase of the transmission signal;
  an amplitude adjuster, configured to adjust an amplitude of the transmission signal;
  an antenna section, configured to radiate an output signal from the transmitter into a space; and
  a coupler section, configured to extract a part of an output from the transmitter;
a first branch detector and a second branch detector, configured to detect levels of outputs from the coupler sections of the first and second transmission branches, respectively;
a signal combining section, configured to combine outputs from the coupler sections of the first and second transmission branches;
a combination detector, configured to detect a level of an output from the signal combining section;
an amplitude controller, configured to control the amplitude adjuster according to the outputs detected by the first and second branch detectors; and
a phase controller, configured to control the phase adjuster according to the output detected by the combination detector.

2. A phased array transmission device comprising:
a first transmission branch and a second transmission branch, each including:
  a transmitter, configured to transmit a transmission signal in a wireless frequency;
  a phase adjuster, configured to adjust a phase of the transmission signal;
  an amplitude adjuster, configured to adjust an amplitude of the transmission signal;
  an antenna section, configured to radiate an output signal from the transmitter into a space; and
  a coupler section, configured to extract a part of an output from the transmitter;
a signal combining section, configured to combine outputs from the coupler sections of the first and second transmission branches;
a combination detector, configured to detect a level of an output from the signal combining section and levels of outputs from the coupler sections of the first and second transmission branches;
an amplitude controller, configured to control the amplitude adjuster according to the outputs from the coupler sections of the first and second transmission branches detected by the combination detector; and
a phase controller, configured to control the phase adjuster according to the output detected by the combination detector.

3. The phased array transmission device according to claim 1, wherein
in a case where a phase error and an amplitude error between the first and second transmission branches are corrected,
the amplitude controller adjusts the amplitude adjuster of at least one of the first and second transmission branches to conform transmission output levels of the first and second transmission branches each other, and in a state where the transmission output levels of the first and second transmission branches are the same, the phase controller detects at least one of an in-phase condition that a combination output level of the signal combining section is maximum and an anti-phase condition that the combination output level of the signal combining section is minimum, and adjusts the phase adjuster of at least one of the first and second transmission branches.

4. The phased array transmission device according to claim 1, wherein three or more transmission branches including the first and second transmission branches are provided, and two transmission branches among the three or more of transmission branches are used as the first and second transmission branches, and the phased array transmission device is provided with an inter-branch error detector, configured to detect a phase error and an amplitude error between the first and second transmission branches, and including the signal combining section and the combination detector.

5. The phased array transmission device according to claim 1, wherein the signal combining section includes a function of a combining and dividing section that has two inputs through which the outputs of the coupler sections of the first and second transmission branches are input and two outputs through which signals input through the two inputs are combined and dividedly output, wherein, in a case where amplitudes of the respective input signals from the first and second transmission branches are the same, the combining and dividing section outputs signals of the same amplitude through the two outputs when phases of the two input signals are the same and outputs signals of different amplitudes through the two outputs in a case where the phases of the two input signals are different from each other, and wherein in a case where a phase error and an amplitude error between the first and second transmission branches are corrected, the amplitude controller adjusts the amplitude adjuster of at least one of the first and second transmission branches to conform amplitudes of transmission output levels of the first and second transmission branches each other, and in a state where the transmission output levels of the first and second transmission branches are the same, the phase controller detects an in-phase condition that two output levels of the signal combining section are the same and a 90-degree difference condition that one of the two output levels of the signal combining section is zero, and adjusts the phase adjuster of at least one of the first and second transmission branches.

6. The phased array transmission device according to claim 1, comprising:

a phase correction table that includes correction data for adjustment of the phase error in the respective transmission branches of the first and second transmission branches; and an amplitude correction table that includes correction data for adjustment of the amplitude error in the respective transmission branches of the first and second transmission branches, wherein the phase controller creates or updates the phase correction table and adjusts the phase adjuster with reference to the correction data of the phase correction table, and the amplitude controller creates or updates the amplitude correction table and adjusts the amplitude adjuster with reference to the correction data of the amplitude correction table.

7. A phased array transmission device comprising:

a first transmission branch and a second transmission branch, each including:
- a transmitter, configured to transmit a transmission signal in a wireless frequency;
- a phase adjuster, configured to adjust a phase of the transmission signal;
- an amplitude adjuster, configured to adjust an amplitude of the transmission signal;
- an antenna section, configured to radiate an output signal from the transmitter into a space; and
- a coupler section, configured to extract a part of an output from the transmitter;

a signal combining section, configured to combine outputs from the coupler sections of the first and second transmission branches;

a combination detector, configured to detect a level of an output from the signal combining section;

an amplitude controller, configured to control the amplitude adjuster according to the output detected by the combination detector; and a phase controller, configured to control the phase adjuster according to the output detected by the combination detector, wherein in a case where a phase error and an amplitude error between the first and second transmission branches are corrected, the amplitude controller adjusts the amplitude adjuster of at least one of the first and second transmission branches to conform transmission output levels of the first and second transmission branches each other, and in a state where the transmission output levels of the first and second transmission branches are the same, the phase controller detects at least one of an in-phase condition that a combination output level of the signal combining section is maximum and an anti-phase condition that the combination output level of the signal combining section is minimum, and adjusts the phase adjuster of at least one of the first and second transmission branches.

8. The phased array transmission device according to claim 7, wherein three or more transmission branches including the first and second transmission branches are provided, and two transmission branches among the three or more of transmission branches are used as the first and second transmission branches, and the phased array transmission device is provided with an inter-branch error detector, configured to detect a phase error and an amplitude error between the first and second transmission branches, and including the signal combining section and the combination detector.

9. The phased array transmission device according to claim 7, wherein the signal combining section includes a function of a combining and dividing section that has two inputs through which the outputs of the coupler sections of the first and second transmission branches are input and two outputs through which signals input through the two inputs are combined and dividedly output, wherein, in a case where amplitudes of the respective input signals from the first and second transmission branches are the same, the combining and dividing section outputs signals of the same amplitude through the two outputs when phases of the two input signals are the same and outputs signals of different amplitudes through the two outputs in a case where the phases of the two input signals are different from each other, and wherein in a case where a phase error and an amplitude error between the first and second transmission branches are corrected, the amplitude controller adjusts the amplitude adjuster of at least one of the first and second transmission branches to conform amplitudes of transmission output levels of the first and second transmission branches each other, and in a state where the transmission output levels of the first and second transmission branches are the same, the phase controller detects an in-phase condition that two output levels of the signal combining section are the same and a 90-degree difference condition that one of the two output levels of the signal combining section is zero, and adjusts the phase adjuster of at least one of the first and second transmission branches.

10. The phased array transmission device according to claim 7, comprising:

a phase correction table that includes correction data for adjustment of the phase error in the respective transmission branches of the first and second transmission branches; and an amplitude correction table that includes correction data for adjustment of the amplitude error in the respective transmission branches of the first and second transmission branches, wherein the phase controller creates or updates the phase correction table and adjusts the phase adjuster with reference to the correction data of the phase correction table, and the amplitude controller creates or updates the amplitude correction table and adjusts the amplitude adjuster with reference to the correction data of the amplitude correction table.

* * * * *